US012704042B2

(12) United States Patent
Schwendemann et al.

(10) Patent No.: US 12,704,042 B2
(45) Date of Patent: Aug. 11, 2026

(54) ENERGY DELIVERY SYSTEM FOR SUPPLYING HYDRAULIC PRESSURE FOR SEVERING AN INTERVENTION MEDIUM

(71) Applicant: Halliburton Energy Services, Inc., Houston, TX (US)

(72) Inventors: Kenneth L. Schwendemann, Carrollton, TX (US); Darrin N. Towers, Carrollton, TX (US); Ryan Anthony Turner, Carrollton, TX (US); William J. Galligan, Carrollton, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 97 days.

(21) Appl. No.: 18/781,334

(22) Filed: Jul. 23, 2024

(65) Prior Publication Data

US 2026/0028897 A1 Jan. 29, 2026

(51) Int. Cl.
*E21B 34/10* (2006.01)
*F15B 15/14* (2006.01)

(52) U.S. Cl.
CPC .......... *E21B 34/10* (2013.01); *F15B 15/1447* (2013.01)

(58) Field of Classification Search
CPC ... E21B 2200/04; E21B 34/10; F15B 15/1447
See application file for complete search history.

(56) References Cited

U.S. PATENT DOCUMENTS 8,042,615 B1 10/2011 Wattenburg
8,336,628 B2 12/2012 Myerley
9,322,242 B2 * 4/2016 Buchan .................. E21B 34/06
10,156,234 B2 12/2018 Quiros Morales
10,316,603 B2 6/2019 Rytlewski
11,965,394 B1 * 4/2024 Turner .................. E21B 34/045
2003/0205688 A1 * 11/2003 Milberger ............. F16K 5/0605 251/315.01
2015/0192017 A1 7/2015 Quiros Morales
2020/0080397 A1 3/2020 Walker
2020/0291750 A1 9/2020 Hill, Jr. et al.

FOREIGN PATENT DOCUMENTS

GB 2493180 A 1/2013

OTHER PUBLICATIONS

Kim et al., Performance analysis of a ball valve used for gas pipelines by introducing nondimensional parameters, Advances in Mechanical Engineering, 2019, pp. 1-10, vol. 11(1).

* cited by examiner

*Primary Examiner* — Abiy Teka
(74) *Attorney, Agent, or Firm* — Conley Rose, P.C.; Rodney B. Carroll

(57) ABSTRACT

An energy delivery system for supplying hydraulic pressure for severing an intervention medium includes a tubular and a housing. Isolation pistons, actuation pistons, and a compression piston are disposed between the tubular and the housing. A first chamber is formed between the tubular and the housing. One or more second chambers are formed between one or more first pairs of the isolation pistons and the actuation pistons. One or more third chambers are formed between one or more second pairs of the isolation pistons and the actuation pistons. The actuation pistons are configured to transmit force to the compression piston to reduce a volume of the first chamber to pressurize a control fluid to actuate a ball valve to sever an intervention medium.

20 Claims, 14 Drawing Sheets

ENERGY DELIVERY SYSTEM FOR SUPPLYING HYDRAULIC PRESSURE FOR SEVERING AN INTERVENTION MEDIUM

CROSS-REFERENCE TO RELATED APPLICATIONS

None.

STATEMENT REGARDING FEDERALLY SPONSORED RESEARCH OR DEVELOPMENT

Not applicable.

BACKGROUND

Ball valves in subsea equipment may be required to complete an array of functions including well isolation from below, shearing intervention strings, and allowing low differential pump through capability to kill a well in the event of an emergency. Shearing intervention mediums (e.g., wirelines, E-lines, and coiled tubing) inside of well bores using ball valve mechanisms like those utilized in subsea safety systems may require a significant amount of energy to be applied to the closing mechanism to shear the intervention medium. This may be supplied by mechanical means (e.g., springs) or compressed gas means. Typically, mechanical springs do not provide enough energy to shear coiled tubing, and a compressed gas system may be required to provide the high levels of energy required. Additionally, to manage high pressure requirements needed in all temperature profiles including from ambient conditions in charge locations, low subsea temperatures, and elevated flowback temperatures, the volumetric requirements to keep a nitrogen pressures relatively flat over the operating window may become large. Because of ID and OD constraints, the nitrogen volume section must may need to be long. In the conventional art, compressed gas may be placed above the BOP flex joint in a separate landing string where additional space is not limited. However, a major disadvantage to this is that the subsea safety tree no longer has access to the energy delivery system in a blind/casing shear ram incident. The systems of the conventional art may be too long to fit in BOP spaceouts. The systems and methods of the present disclosure may address one or more of the above-mentioned deficiencies.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
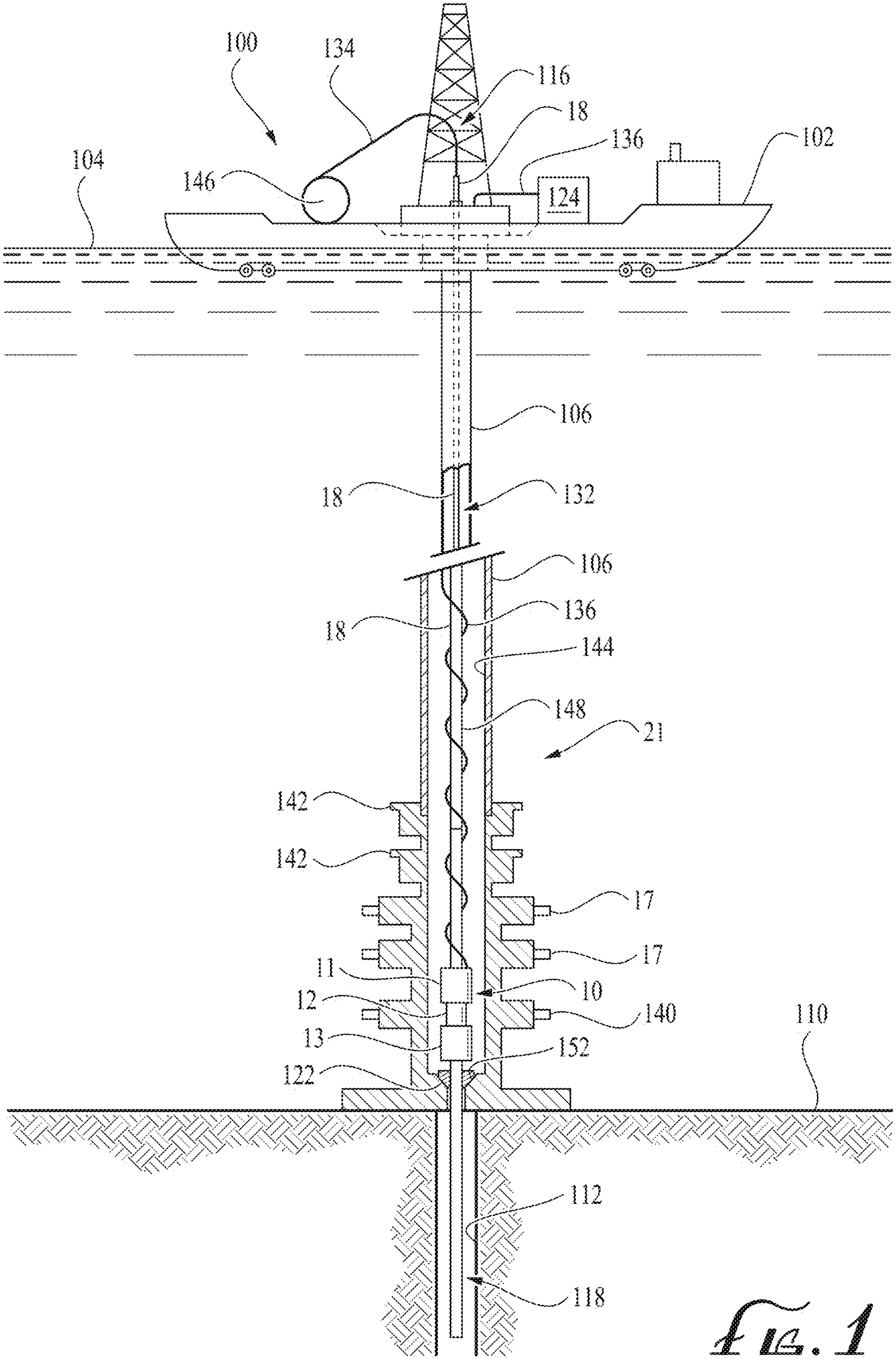
FIG. 1 is a diagram illustrating an exemplary environment for a subsea tree, according to an embodiment of the present disclosure.

It should be understood at the outset that although illustrative implementations of one or more embodiments are illustrated below, the disclosed systems and methods may be implemented using any number of techniques, whether currently known or not yet in existence. The description that follows includes example systems, methods, techniques, and program flows that embody aspects of the disclosure. However, it is understood that this disclosure may be practiced without these specific details. For brevity, well-known steps, protocols, structures, and techniques have not been shown in detail in order not to obfuscate the description. The disclosure should in no way be limited to the illustrative implementations, drawings, and techniques illustrated below, but may be modified within the scope of the appended claims along with their full scope of equivalents.

As used herein the terms "uphole", "upwell", "above", "top", and the like refer directionally in a wellbore towards the surface, while the terms "downhole", "downwell", "below", "bottom", and the like refer directionally in a wellbore towards the toe of the wellbore (e.g. the end of the wellbore distally away from the surface), as persons of skill will understand. Orientation terms "upstream" and "downstream" are defined relative to the direction of flow of fluid, for example relative to flow of well fluid in the well. As used herein, orientation terms "upstream," "downstream," are defined relative to the direction of flow of well fluid in the well casing. "Upstream" is directed counter to the direction of flow of well fluid, towards the source of well fluid (e.g., towards perforations in well casing through which hydrocarbons flow out of a subterranean formation and into the casing). "Downstream" is directed in the direction of flow of well fluid, away from the source of well fluid.

Hydrocarbons, such as oil and gas, may be produced or obtained from subterranean reservoir formations that may be located onshore or offshore. The development of subterranean operations and the processes involved in removing hydrocarbons from a subterranean formation typically involve a number of construction steps such as drilling a wellbore at a desired well site, isolating the wellbore with a barrier material, completing the wellbore with various production equipment, treating the wellbore to optimize production of hydrocarbons, and providing surface production equipment for the recovery of hydrocarbons from the wellhead.

During the completion operations, an upper and/or lower completion may be installed into the wellbore. A lower completion may be utilized to isolate the formation and/or provide a filter media for unwanted erosive particles. For example, a packer and at least one sand screen may be used to isolate a production zone when erosive sand particles are present or predicted within the fluids produced from the formation, e.g., production fluids. An upper completion may be utilized to isolate another oil bearing formation and/or provide one or more production valves to isolate the production tree from the wellbore environment.

In some scenarios, a completion operation can be performed via a workstring to open or close one or more valves, perforate the casing string in one or more locations, clean-out debris at a target depth, swap out fluids, or a combination thereof. A subsea safety tree can be placed within a blow-out preventer stack to provide a pathway for a service tool string to pass through the blow-out preventer and/or the production tree and/or subsea wellhead and into the wellbore. The subsea safety tree can comprise one or more actionable valves with an open position and a closed position. In an emergency type scenario, the subsea safety tree can be closed when the workstring is within the subsea safety tree and the service tool string is somewhere below the subsea safety tree, e.g., the lower completion. The closure of the one or more actionable valves can cut the workstring as the valve closes to a sealing position. The sealing position of the one or more actionable valves can isolate the riser environment above the subsea tree from the wellbore environment below the subsea safety tree. In some scenarios, the closure of one of the shears of the blow-out preventer stack can sever or cut a control line used to actuate, e.g., open and close, the subsea safety tree.

In some embodiments of the present disclosure, shearing rams of a BOP incorporate an energy delivery system utilizing a common actuation piston with multiple separated zones in which activating pressure acts against a high-pressure side of the zone and be unbalanced against a low-pressure gas chamber on the other side of the zone. The unbalanced pressure in each zone may produce a load and each load may have an additive effect on the actuation piston. The system may be relatively short and may have the potential to fit into BOP spaceouts. The actuation piston can be housed in a separate module or included in a subsea valve module. This module may have a hydraulic chamber that would be used to hold back the load produced by the activating pressure. The force required to hold back the load may be generated from hydraulic pressure on the open side of the safety valve ball mechanism or alternatively be held back through a piloted directional control valve. The additive zone-based actuation piston according to the present disclosure may allow low activation pressures (as compared to the conventional art) to be used to generate the energy necessary to shear heavy intervention strings such as coiled tubing. These activation energies may be low enough that hydrostatic pressure could be easily used to generate the required loads.

For relatively shallow wells (<1500 ft), compressed gas at much lower pressures may be used as the activation pressure. Additionally, in order to tune the energy delivery system, the pressure on the low-pressure gas side may be adjusted to balance the load the activation pressure is supplying. Additionally, a separate directional control valve may be used to apply to activating pressure. If hydrostatic pressure is utilized, it may be allowed into the high-pressure zones only when needed by removing the pilot line pressure. The additive nature of the load compounding from the design may allow the energy delivery system to be short enough to fit inside of a BOP spaceout. Another advantage of the system of the present disclosure is the reduction of activating pressure required to complete shearing operations. It may eliminate the need to charge nitrogen to high pressures that could endanger equipment and personnel. In some embodiments, the system of the present disclosure does not require charged nitrogen.

In some embodiments, the energy delivery system includes a common activation piston which is driven by multiple pistons separating a series of high and low pressure zones. The common piston may have a fluid reservoir which may be used as the means of delivering the energy to the tool. The energy may be controlled by a piloted directional control valve whose pilot can be routed to surface controls or a remotely operated control system. The low-pressure zones may consist of air at ambient pressure or be slightly charged using compressed gas. The high-pressure zones may be interconnected and the activation pressure may be supplied by either a compressed gas or by the naturally occurring hydrostatic pressure from the depth of the subsea tool. In some embodiments, energy may be supplied through an annular cavity artificially by the BOP system of seals and interfaces with the lower landing string. The energy delivery system design may be used outside of the BOP as a replacement for a conventional nitrogen-based accumulator in tools like the electrohydraulic DASH system. There may be a significant reduction of HSE risks associated with these systems.

In some embodiments, the energy delivery system works by separating the high pressure and low-pressure zones using a series of pods or cans. Under differential pressure, the cans may collapse generating an actuating load. These loads may be cumulative. In some embodiments, five pods are arranged in series. However, any number of pods may be used. For example, one, two, three, four, six, seven, eight, nine, ten, or more pods may be used. The upper sections of the pods may be held static by the outer housing and lower sub. Inside of the pods may be atmospheric pressure. As higher pressure is allowed to enter the housing, it may surround the pods and begins to collapse them, pushing the piston to the left and generating load. The number of pods may be selected according to the magnitude of pressure required to be delivered to the module.

The method of the present disclosure may include creating a pump using potential energy of the hydrostatic head in surface reservoirs. Hydrostatic head experienced on the sea floor (or other source of relatively high pressure such as a compressed gas) may be used in a series of unbalanced chambers to create a compounding effect of the load experienced. The source of the pressure balance may vary from annular hydrostatics or compressed gas on high pressure side and tuned gas chambers on the low-pressure side. Some embodiments include surface or remotely controlled hydraulic circuits to activate loads on the system only when needed.

Referring to FIG. 1, an exemplary subsea well testing system 100 may include a floating platform 102 (e.g., a drillship), which is dynamically positioned on a water surface 104 with a riser 106 extending from a service platform of the floating platform 102 to a blowout preventer ("BOP") stack 21 on the seafloor 110. A wellbore 112 can be drilled from the seafloor 110 to a target subterranean formation. In a scenario, a casing string can extend downward from a wellhead located on the seafloor 110 and be cemented into the wellbore 112. A production tree may be coupled between the BOP stack 21 and the wellhead. In some embodiments, a tubing string 18 extends from platform 102, through blowout preventer stack 21, and into the wellbore 112. The tubing string 18 can be referred to as a header extension and may provide a pathway through the BOP stack 21 and production tree for a service tool string conveyed into the wellbore 112 on a workstring 134.

The subsea well testing system 100 may include a subsea tree 11 (e.g., a subsea test tree or a subsea safety tree) positioned or landed within the BOP stack 21. The subsea tree 11 can be fluidically coupled to a topside control station 124 by one or more fluid conduits 136. A landout 122 coupled to a lower portion 118 of the tubing string 18 can be landed or positioned within a receiving shoulder 152 within the BOP stack 21. The landout 122 can align the subsea tree 11 with one or more features, e.g., shear rams, within the BOP stack 21. A lower portion 118 of the tubing string 18 can extend from the subsea tree 11 into the wellbore 112.

The one or more fluid conduits 136 can include electrical conductors and/or optical conductors coupled to additional downhole tools. For example, upper portion 132 and/or lower portion 118 may include a sensor module and/or fluid control valve electrically and/or optically coupled to the one or more conduits 24. The one or more conduits 24 may be operationally connected to surface sources of power (e.g., electrical and/or hydraulic) in addition to electronics, communications, and power that may be provided via topside control station 124.

The subsea tree 11 is shown as landed in the BOP stack 21 on the tubing string 18. The workstring 134 can be conveyed into the tubing string 18 via a passage 116 and/or the wellbore 112 by a wellbore servicing unit 146 for conveying a workstring, for example, a coil tubing unit, a wireline unit, a logging unit, or any other suitable servicing unit. Although the platform 102 is illustrated as a vessel or ship, the platform 102 may include any platform suitable for wellbore drilling, production, or injection operations (e.g., a barge rig, a submersible rig, a jack-up rig, a platform rig, a floating rig, a semi-submersible platform, a drill ship, or any other type of wellbore servicing rig).

The exemplary blowout preventer stack 21 may include pipe ram seals 138 and shear rams 17. A lower marine riser package may be mounted between the blowout preventer stack 21 and the riser 106 and may include annular preventer seals 142. The lower marine riser package may also include control modules for operating the annular preventer seals 142, the pipe ram seals rams 138 and the shear rams 17 in the blowout preventer stack 21, and/or other controls as needed. The rams 138 and 17 and the annular preventer seals 142 may define a passage 144 for receiving the tubing string 18 and/or the subsea tree 11. The subsea tree 11 may be arranged within the blowout preventer stack 21 with the slick joint 148 extending from the subsea tree 11 into the annular preventer seals 142. The subsea tree 11 can be operable by the control station 124 with hydraulic pressure via the conduits 24. For example, the subsea tree 11 may be actuated (e.g., positioned in the closed position) by hydraulic pressure via the control station 124. The subsea tree 11 may be coupled to an energy delivery system 13 by a slick joint 12.

Figure 2:
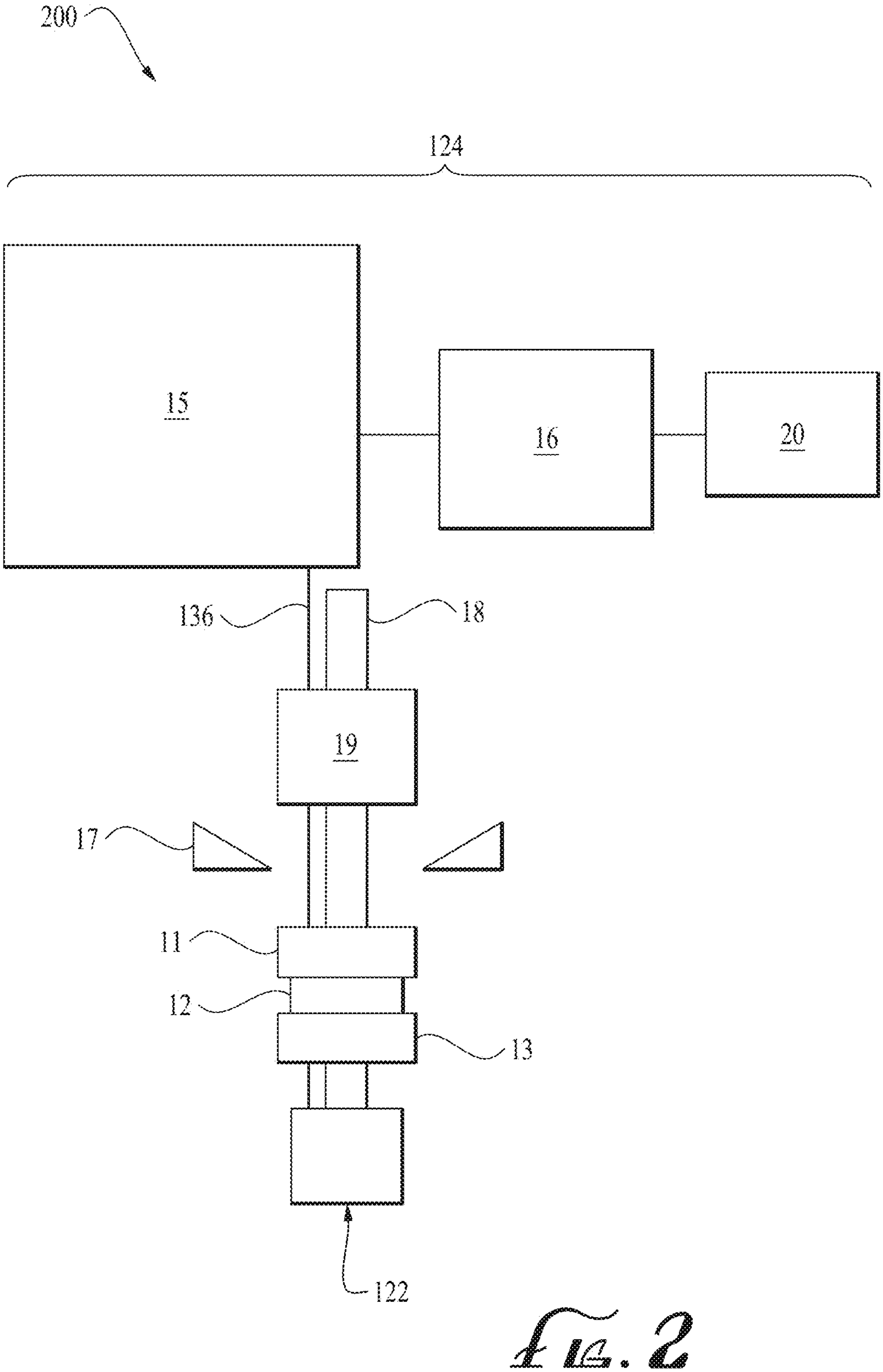
FIG. 2 is a schematic diagram of an exemplary subsea safety system, according to an embodiment.

Referring to FIG. 2, an exemplary subsea safety system 200 is shown. The subsea safety system 200 may comprise an emergency shutdown panel 20 in communication with a hydraulic power unit 16. The emergency shutdown panel 20 may allow operators to execute a command to immediately stop the flow of oil and gas from the wellhead, thereby preventing a blowout. Upon receiving a command from the emergency shutdown panel 20, the hydraulic power unit 16 may deliver pressurized hydraulic fluids through an umbilical 15. In some embodiments, the umbilical 15 is a 21-core DH umbilical. The umbilical 15 may control and/or supply pressurized fluid through a fluid conduit 136. There may be a retainer valve 19 along the fluid conduit 136 to prevent backflow of fluid to the umbilical 15.

The subsea safety system 200 may further include a subsea tree 11, a slick joint 12 and an energy delivery system 13. The slick joint 12 may extend from the subsea tree 11 to the energy delivery system 13. In FIG. 2, the subsea tree 11 is shown as being disposed above the energy delivery system 13, however, in some embodiments, the subsea tree 11 is disposed below the energy delivery system 13. The tubing string 18 may extend through the subsea tree 11, through the slick joint 12, and through the energy delivery system 13. The energy delivery system 13 may use compressed gas to generate hydraulic pressure for the subsea tree 11 to shear the tubing string 18 (and/or any other intervention media such as wirelines, E-lines, slicklines, or coiled tubing), as discussed in further detail below. Compressed fluid for operating the subsea tree 11 may be supplied from the fluid conduit 136. Shear rams 17 may be disposed above the subsea tree 11 and may be configured to cut through the tubing string 18 in case of emergency. The shear rams 17 in combination with the subsea tree 11 may each be capable of severing the tubing string 18, and thus offer redundant protection against blowouts. The subsea tree 11 may be controlled automatically or by a hydraulic control line.

Figure 3:
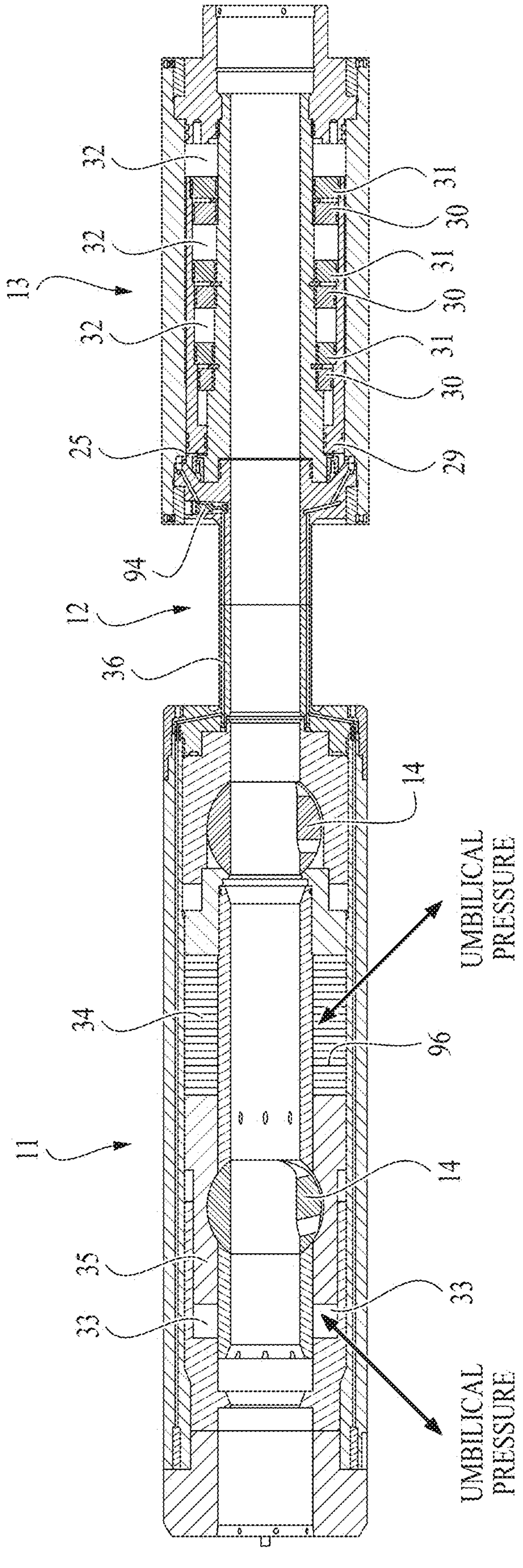
FIG. 3 is a cross-sectional side view of an exemplary subsea tree coupled to an energy delivery system by a slick joint, according to an embodiment.

Referring to FIG. 3, a subsea tree 11 coupled to an energy delivery system 13 by a slick joint 12 is shown. The energy delivery system 13 may include an elongated piston 29, isolation pistons 30, and actuation pistons 31. There may be piston chambers 32 between the isolation pistons 30 and the actuation pistons 31. In some embodiments, the piston chambers 32 and/or another chamber (e.g., in the energy delivery system 13) may contain a compressed gas such as nitrogen or air. These chamber(s) may be pre-charging at the surface and the charge may be retained until needed for an emergency shearing operation. In response to a directional control valve being deactivated or another emergency operation, the piston chambers 32 may be allowed to translate, powered by the gas pressure, which may cause the elongated piston 29 to slide. A control fluid chamber 25 defined by the elongated piston 29 may thus be reduced in volume. As discussed in further detail below, the isolation pistons 30 and the actuation pistons 31 can enhance the amount of force that the pressurized fluid can generate. As used herein, the term "piston" is used in the broadest sense and is not limited to moving components. For example, the isolation pistons 30 are referred to as such even through they may be stationary.

The slick joint 12 may extend from an axial end of the energy delivery system 13 to an axial end of the subsea tree 11. An outer diameter of the slick joint 12 may be less than an outer diameter of the energy delivery system 13. In some embodiments, the ram seal 140 is configured to seal on the slick joint 12. The slick joint 12 may comprise a slick joint line 36 that fluidly couples the control fluid chamber 25 of the energy delivery system and the second actuation chamber 34 of the subsea tree 11.

The subsea tree 11 may include one or more ball valves 14, a first actuation chamber 33, and a second actuation chamber 34. In some embodiments, the second actuation chamber 34 may contain a spring 96 configured to bias the ball piston 35. When the volume of the control fluid chamber 25 is reduced, the slick joint line 36 may be pressurized, which may in turn pressurize the second actuation chamber 34. The pressure inside the second actuation chamber 34 may exert a force on a ball piston 35 which may be mechanically coupled to at least one of the ball valves 14. When the ball piston 35 translates, the ball valve 14 may rotate, thus enabling the ball valve 14 to shear through the intervention media (e.g., tubing string 18).

The ball valve 14 may be disposed in the subsea tree 11, which may be coupled to the energy delivery system 13 by the slick joint 12. The first actuation chamber 33 may be on a first side of the ball valve 14 and the second actuation chamber 34 may be on a second side of the ball valve 14. The slick joint line 36 may fluidly couple the control fluid chamber 25 and the second actuation chamber 34. The fluid conduit 136 may supply control fluid to the first actuation chamber 33, the second actuation chamber 34, and/or the control fluid chamber 25. The control fluid may be a glycol-based liquid or any other suitable fluid (e.g., an incompressible fluid). Control fluid from the umbilical may be pumped in or out of the first actuation chamber 33 and/or the second actuation chamber 34 depending on the operation.

Figure 4A:
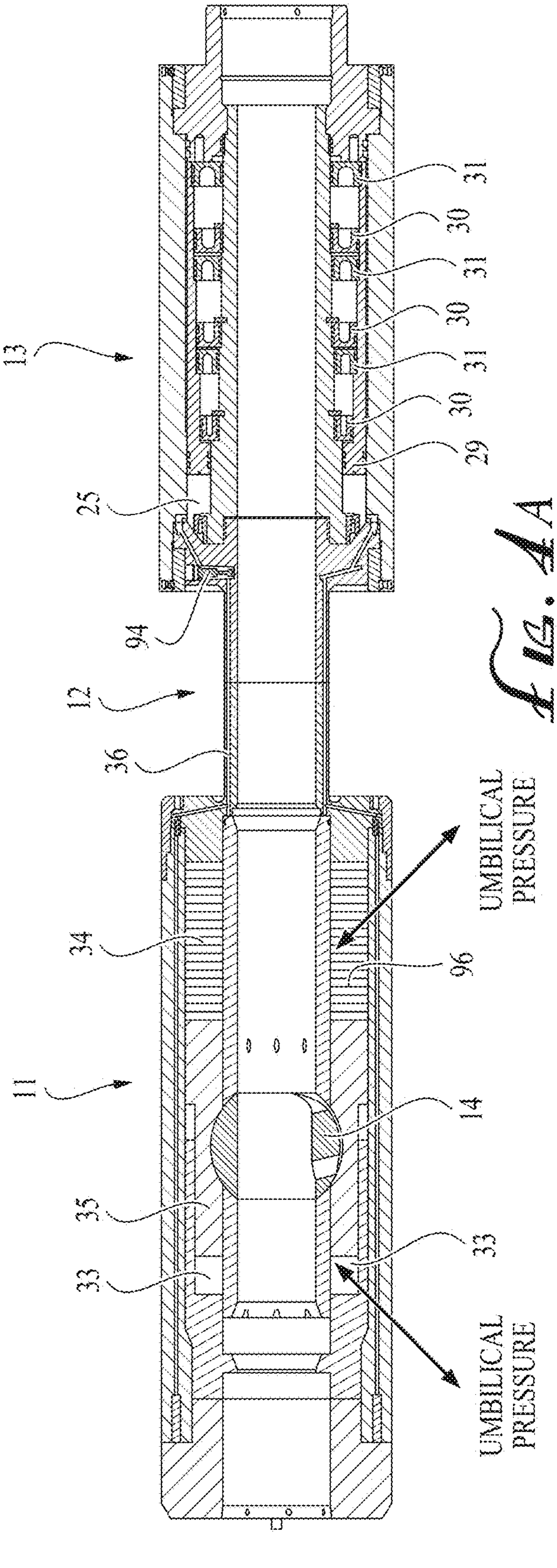
FIG. 4A is a cross-sectional view of an exemplary subsea tree, in an open position, coupled to an energy delivery system by a slick joint, according to another embodiment.
Figure 4B:
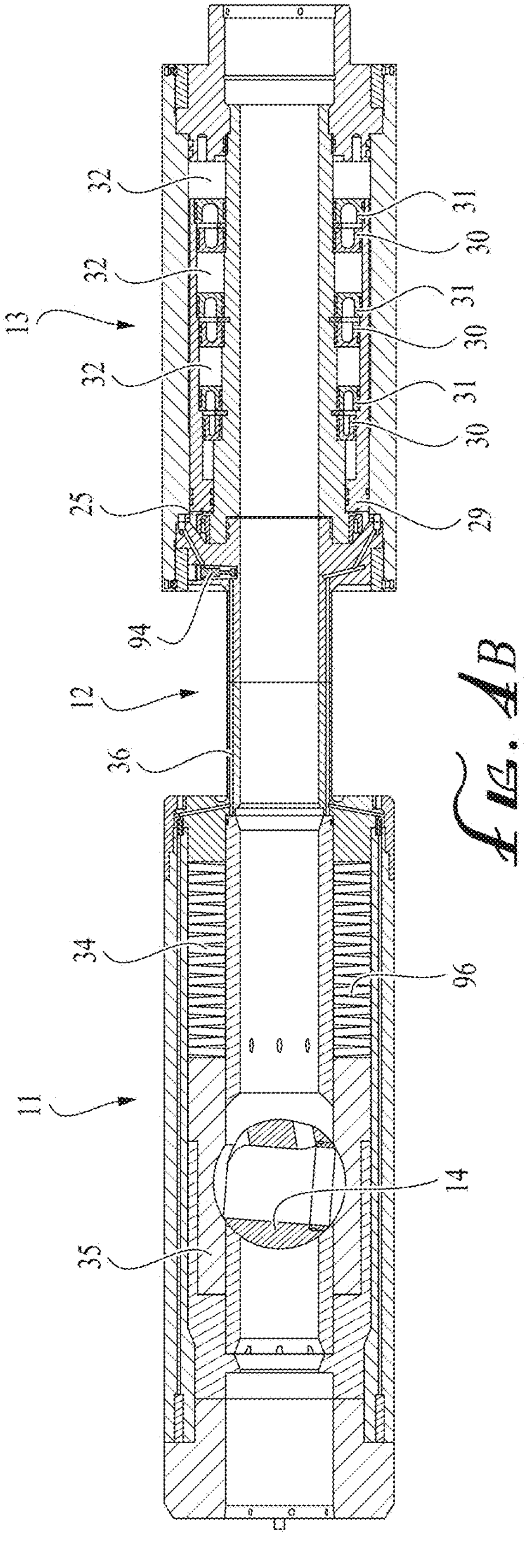
FIG. 4B is a cross-sectional view of the subsea tree of FIG. 4A, in a closed position, coupled to the energy delivery system of FIG. 4A by the slick joint of FIG. 4A.

FIGS. 4A and 4B show the transition from the open position of the ball valve 14 to the closed position of the ball valve 14 according to another embodiment of the subsea tree 11 in which there is one ball valve 14. Pneumatic pressure in the piston chamber 32 may cause the elongated piston 29 to translate, which may create hydraulic pressure in the control fluid chamber 25. Because the control fluid chamber 25 may be in fluid communication with the second actuation chamber 34 via the slick joint line 36, the second actuation chamber 34 may also be under hydraulic pressure, which may cause the ball piston 35 to translate, which may cause the ball valve 14 to rotate closed to shear the intervention medium. Once in the closed position, the ball valve 14 may be returned to the open position by pressurizing the first activation chamber 33.

Figure 5A:
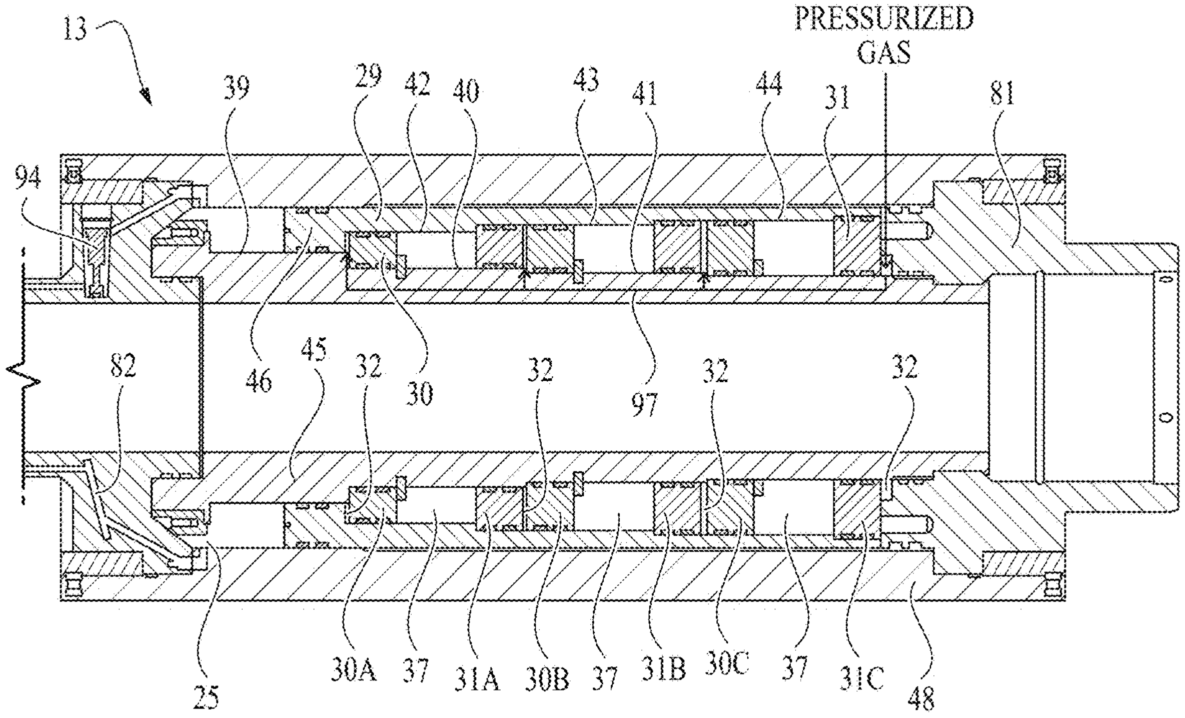
FIG. 5A is a cross-sectional side view of an exemplary energy delivery system, in an open position, according to an embodiment.
Figure 5B:
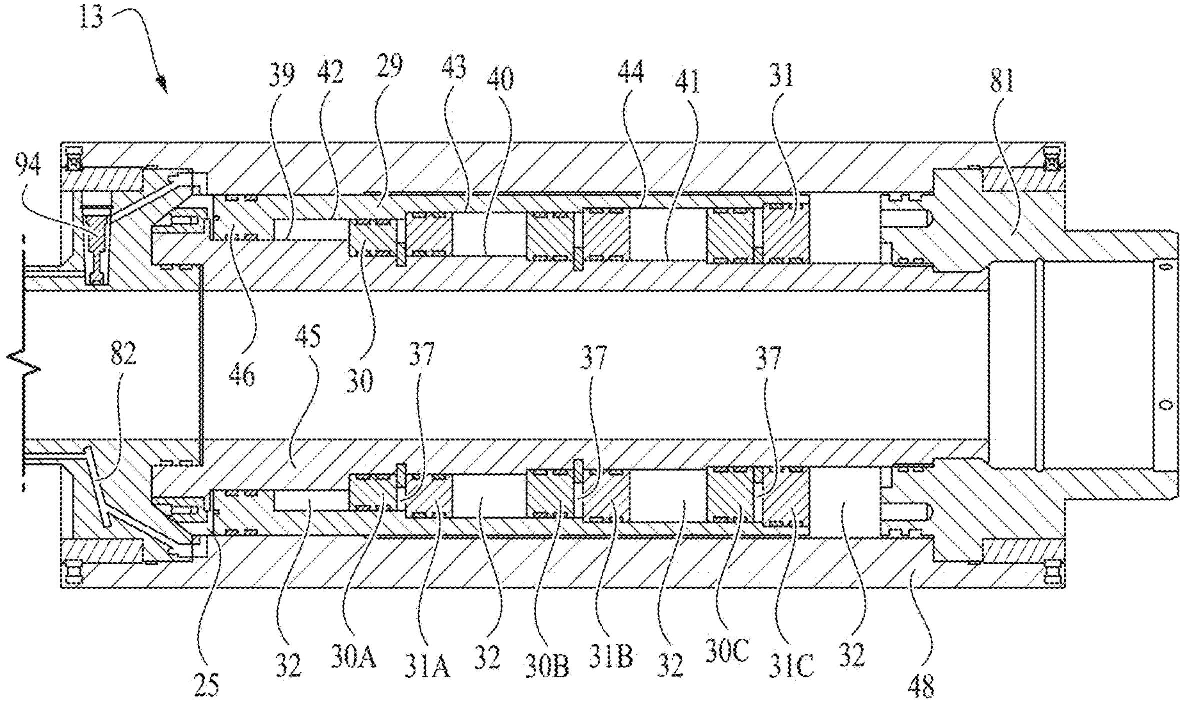
FIG. 5B is a cross-sectional side view of the energy delivery system of FIG. 5A in a closed position.

Referring to FIGS. 3, 5A, and 5B, an energy delivery system 13 for supplying hydraulic pressure for severing an intervention medium is shown. The energy delivery system 13 may include a tubular 45 which may include a first step 39, a second step 40, and a third step 41. A first isolation piston 31A may abut the first step 39, a second isolation piston 31B may abut the second step 40, and a third isolation piston 31C may abut the third step 41. An elongated piston 29 may be disposed concentrically about the tubular 45. The elongated piston 29 may include a flange 46, a fourth step 42, a fifth step 43, and a sixth step 44. A first actuation piston 31A may abut the fourth step 42, a second actuation 31B piston may abut the fifth step 43, a third actuation piston 31C may abut the sixth step 44. A housing 48 may be disposed concentrically about the elongated piston 29. A control fluid chamber 25 may be formed and/or defined by the tubular 45, the housing 48, and the flange 46.

The elongated piston 29 may be configured to slide to reduce a volume of the control fluid chamber 25 to pressurize a control fluid to actuate a ball valve 14 to sever an intervention medium. The elongated piston 29 sliding may be powered by compressed gas between the first actuation piston 31A and the second isolation piston 30B, between the second actuation piston 31B and the third isolation piston 30C, and against the third actuation piston 31C. The elongated piston 29 may be allowed to slide in response to a pilot line bleeding, wherein the pilot line is connected to directional control valve. The first piston chambers 32 may be connected by a fluid passageway 97 formed in the tubular 45. The first piston chambers 32 may be a volume between the elongated piston 29, the tubular 45, and the first isolation piston 30A; a volume between the first actuation piston 31A, the second isolation piston 30B, the elongated piston 29, and the tubular 45; a volume between the second actuation piston 31B, the third isolation piston 30C, the elongated piston 29, and the tubular 45; and/or a volume between the third actuation piston 31C, the elongated piston 29, the tubular 45, and a lower sub 81. The lower sub 81 may be concentrically disposed with respect to the elongated piston 29 and/or the housing 48. The lower sub 81 may be disposed between the tubular 45 and the housing 48.

In some embodiments, the first isolation piston 30A is smaller than the second isolation piston 30B, which is smaller than the third isolation piston 30C. Specifically, a projected axial area of the first isolation piston 30A may be smaller than a projected axial area of the second isolation piston 30B, which may be smaller than a projected axial area of the third isolation piston 30C. In some embodiments, the first actuation piston 301A is smaller than the second actuation piston 31B, which is smaller than the third actuation piston 31C. Specifically, a projected axial area of the first actuation piston 31A may be smaller than a projected axial area of the second actuation piston 31B, which may be smaller than a projected axial area of the third actuation piston 31C. In some embodiments, an outer diameter of the first step 39 is greater than an outer diameter of the second step 40, which is greater than an outer diameter of the third step 41. In some embodiments, the inner diameter of the fourth step 42 is greater than the inner diameter of the fifth step 43, which is greater than the inner diameter of the sixth step 44. In some embodiments, a radial gap between the first step 39 and the fourth step 42 is less than a radial gap between the second step 40 and the fifth step 43, which is less than a radial gap between the third step 41 and the sixth step 44.

The elongated piston 29 may be in sliding engagement with the housing 48 and/or the tubular 45. There may be second piston chambers 37 between the first isolation piston 30A, the first actuation piston 31A, the elongated piston 29, and the tubular 45; between the second isolation piston 30B, the second actuation piston 31B, the elongated piston 29, and the tubular 45; and/or between the third isolation piston 30C, the third actuation piston 31C, the elongated piston 29, and the tubular 45. The second piston chambers 37 may have ambient pressure gas inside or gas at slightly above ambient pressure when the ball valve 14 is in the open position. A control fluid chamber exit conduit 82 may be in fluid communication with the control fluid chamber 25 and the slick joint line 36 and may allow the control fluid to exit from the control fluid chamber 25 and enter the slick joint line 36. There may be a first directional control valve 94 which may control the flow of control fluid out of the control fluid chamber 25. The first directional control valve 94 may prevent backflow of fluid into the control fluid chamber 25.

Figure 6A:
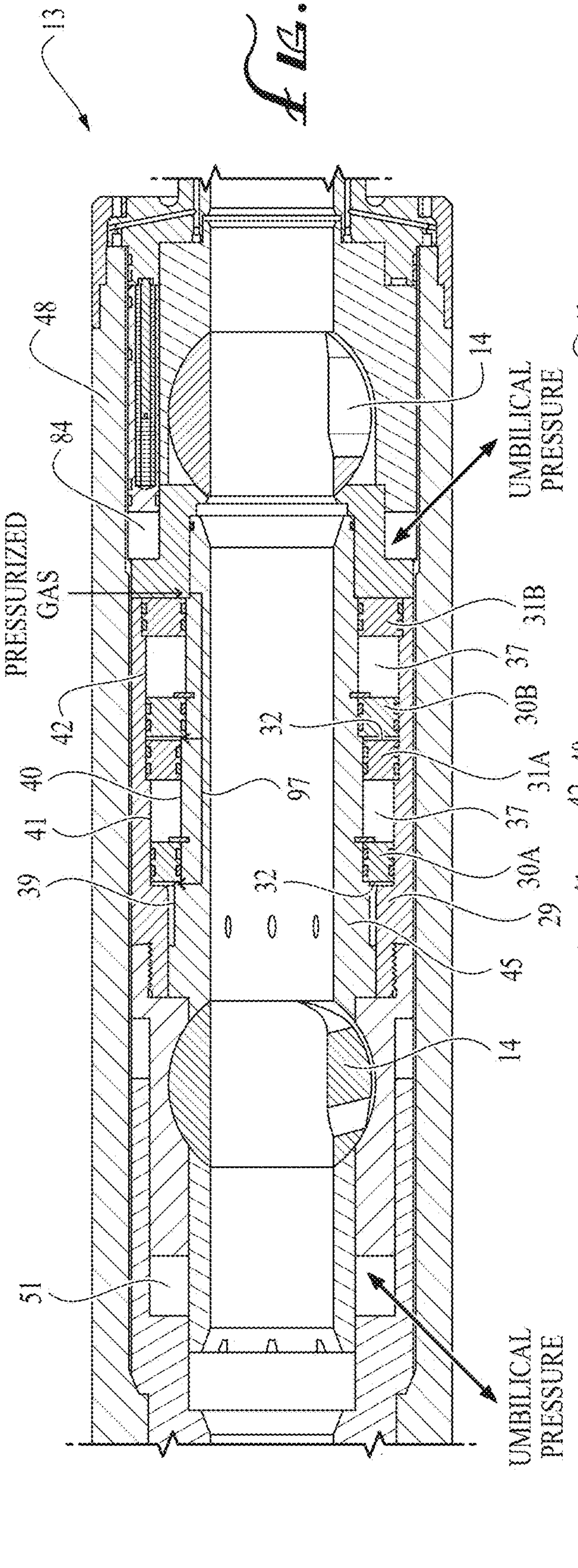
FIG. 6A is a cross-sectional side view of an exemplary energy delivery system, in an open position, according to yet another embodiment.
Figure 6B:
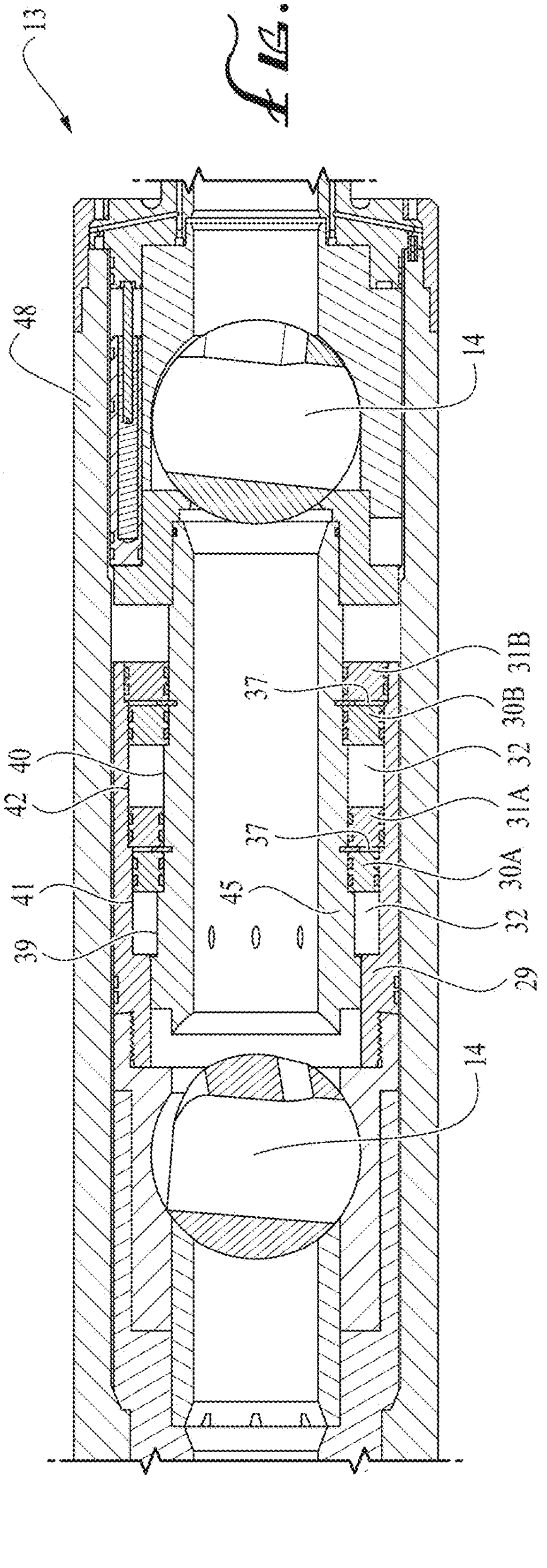
FIG. 6B is a cross-sectional side view of the energy delivery system of FIG. 6A in a closed position.

Referring to FIGS. 3, 6A, and 6B, an energy delivery system 13 for supplying hydraulic pressure for severing an intervention medium (e.g., tubular string 18, coil tubing), may include a tubular 45 comprising a first step 39 and a second step 40. A first isolation piston 30A may abut the first step 39. A second isolation piston 30B may abut the second step 40. An elongated piston 29 may be concentrically disposed about the tubular 45 and mechanically coupled to a ball valve 14. The elongated piston 29 may include a third step 41 and a fourth step 42. A first actuation piston 31A may abut the third step 41. A second actuation piston 31B may abut the fourth step 42. The elongated piston 29 may be configured to slide to actuate the ball valve 14, in response to a pressure increase between the second isolation piston 30B and the first actuation piston 31A and against the second actuation piston 31B. A first control chamber 51 may be formed in the energy delivery system 13. The first control chamber 51 may be configured to contain a pressurized fluid for opening the ball valve. At least one of the ball valves 14 may be disposed between the elongated piston 29 and the first control chamber 51.

In some embodiments, the first isolation piston 30A is smaller than the second isolation piston 30B. Specifically, a projected axial area of the first isolation piston 30A may be smaller than a projected axial area of the second isolation piston 30B. In some embodiments, the first actuation piston 301A is smaller than the second actuation piston 31B. Specifically, a projected axial area of the first actuation piston 31A may be smaller than a projected axial area of the second actuation piston 31B. In some embodiments, an outer diameter of the first step 39 is greater than an outer diameter of the second step 40. In some embodiments, the inner diameter of the third step 41 is greater than the inner diameter of the fourth step 42. In some embodiments, a radial gap between the first step 39 and the third step 41 is less than a radial gap between the second step 40 and the fourth step 42.

The tubular 45 may be disposed between the two ball valves 14. Pressurizing the first control chamber 51 with fluid (e.g., liquid) may cause one of the ball valves to open (e.g., the left ball valve 14). Pressurizing gas in the first piston chambers 32 with fluid (e.g., gas) may cause the ball valve 14 to close in response to a directional control valve being deactivated. The first piston chambers 32 may be a volume between the first isolation piston 30A, the first actuation piston 31A, the tubular 45, and the elongated piston 29; and a volume between the second isolation piston 30B, the second actuation piston 31B, the tubular 45, and the elongated piston 29. To open the lower ball valve 14, an auxiliary control chamber 84 may be pressurized. The second piston chamber 37 may be a volume between the first actuation piston 31A, the second isolation piston 30B, the tubular 45, and the elongated piston 29. The second piston chamber 37 may have ambient pressure gas or gas at slightly above ambient pressure inside it when the ball valve 14 is in the open position. Pressurized fluid from the umbilical 15 may be pumped in or out of the first control chamber 51 and/or the auxiliary control chamber 84 depending on the operation.

Figure 7A:
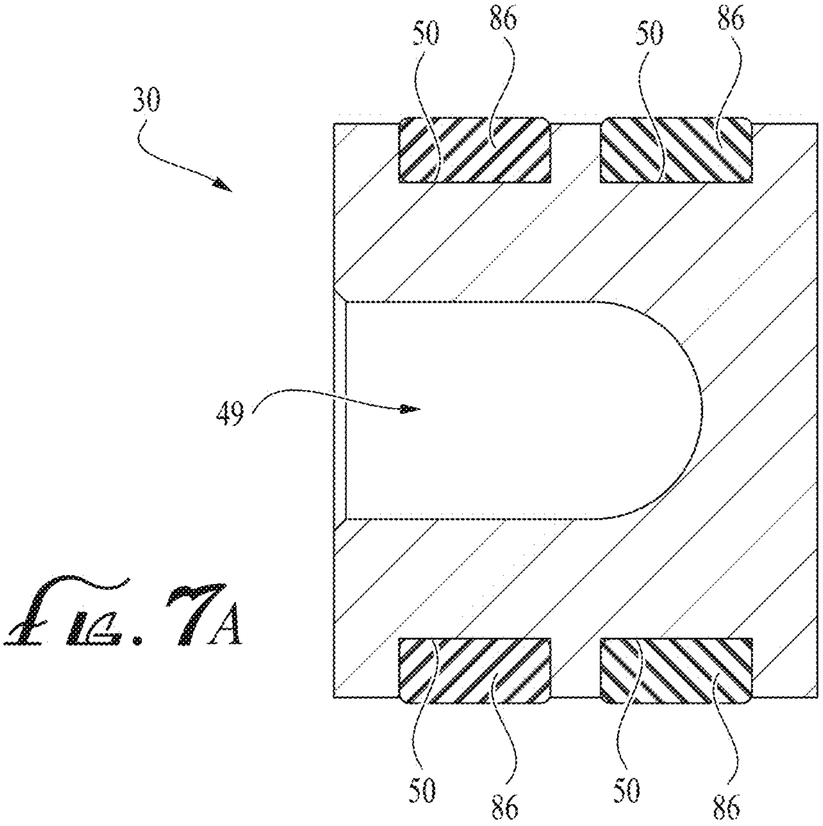
FIG. 7A is a cross-sectional side view of an exemplary isolation piston, according to an embodiment.
Figure 7B:
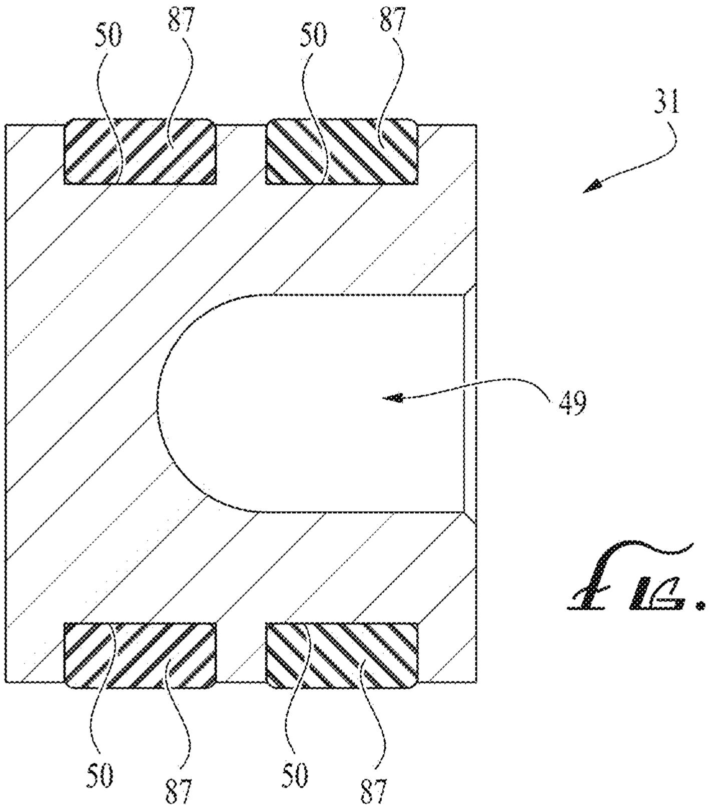
FIG. 7B is a cross-sectional side view of an exemplary actuation piston, according to an embodiment.

Referring to FIGS. 7A and 7B, the isolation piston 30 and the actuation piston 31 are shown in more detail. Each isolation piston 30A,30B,30C and each actuation piston 31A,31B,31B may include a pocket 49. Each isolation piston 30A,30B,30C and each actuation piston 31A,31B, 31C may include at least one groove 50 in which may be disposed a seal (e.g., an O-rings). The grooves 50 may be formed in inner and outer circumferential surfaces of the isolation piston 30 and the actuation piston 31. For example, each isolation piston 30A,30B,30C may contain seals 86 in the grooves. Each actuation piston 31A,31B,31B may contain seals 87. For example, the seals 87 may be disposed in the grooves 50. The various seals 86,87 may be configured to make a seal between the isolation piston 30 and the tubular 45, between the isolation pistons 30A,30B,30C and the elongated piston 29, between the actuation pistons 31A,31B,31B and the tubular, and/or between the actuation pistons 31A,31B,31B and the elongated piston 29. The seals 86 may seal the inner circumference surface the outer circumferential surface of the isolation piston 30. The seals 87 may seal the inner circumferential surface and the outer circumferential surface of the actuation piston 31. The pocket 49 of the isolation piston 30 may be configured to face the pocket 49 of the actuation piston 31 such that when the actuation piston 31 abuts or comes in close proximity to the isolation piston 30, the pocket 49 of the isolation piston 30 and the pocket 49 of the actuation piston 31 form a second piston chamber 37. This may prevent an over-pressurization condition between the isolation piston 30 and the actuation piston 31 when the energy delivery system 13 fires. In some embodiments, the starting pressure inside the pocket is approximately 15 psi (e.g., 10-20, 8-12, 13-18, or 13-17 psi). The gas may be air or nitrogen, for example. After final compression (e.g., after closure of the ball valve 14), the pressure inside the pocket 49 may be approximately 150 psi (e.g., 120-150, 140-160, 100-150, or 150-200 psi). In some embodiments, the pressure in the piston chamber 32 and/or the third chamber 57 is approximately 3,000 psi (e.g., 2,000-4,000, 2,500-3,500, 2,000-3,000, or 3,000-4000 psi).

Figure 8A:
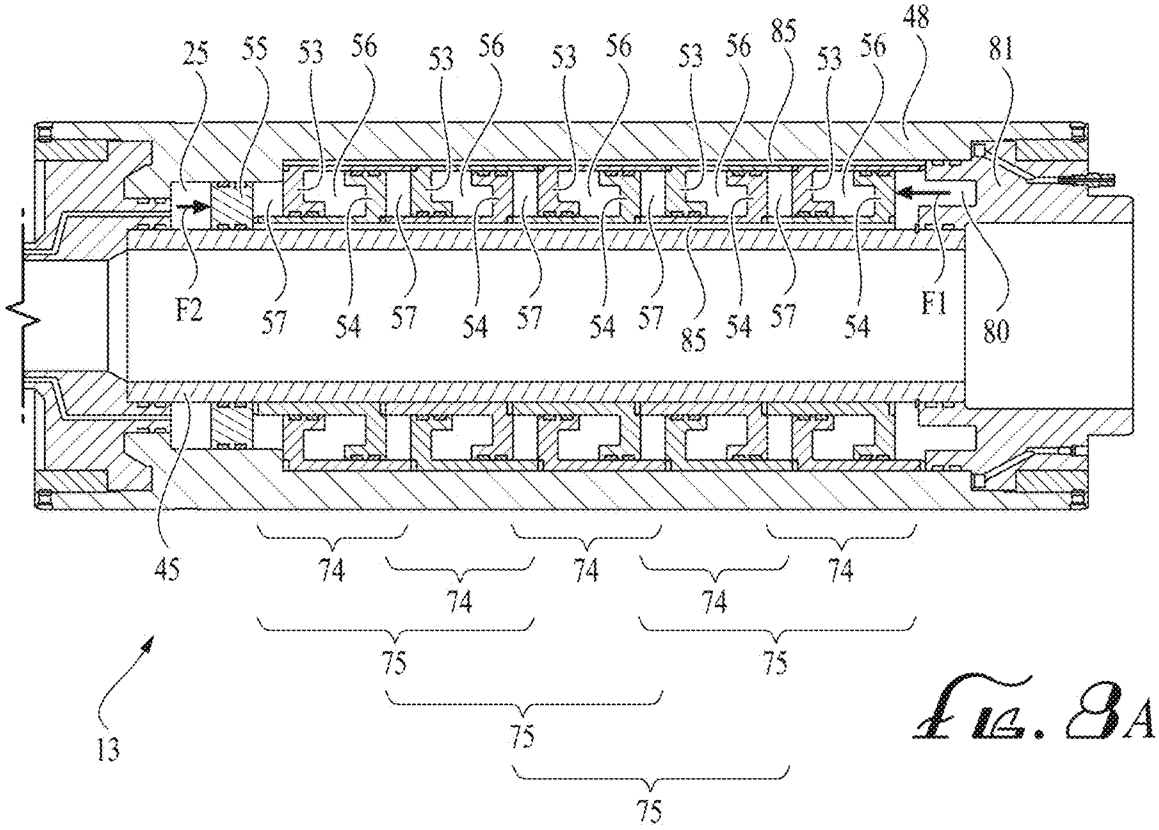
FIG. 8A is a cross-sectional side view of an exemplary energy delivery system, in the open position, according to yet another embodiment.
Figure 8B:
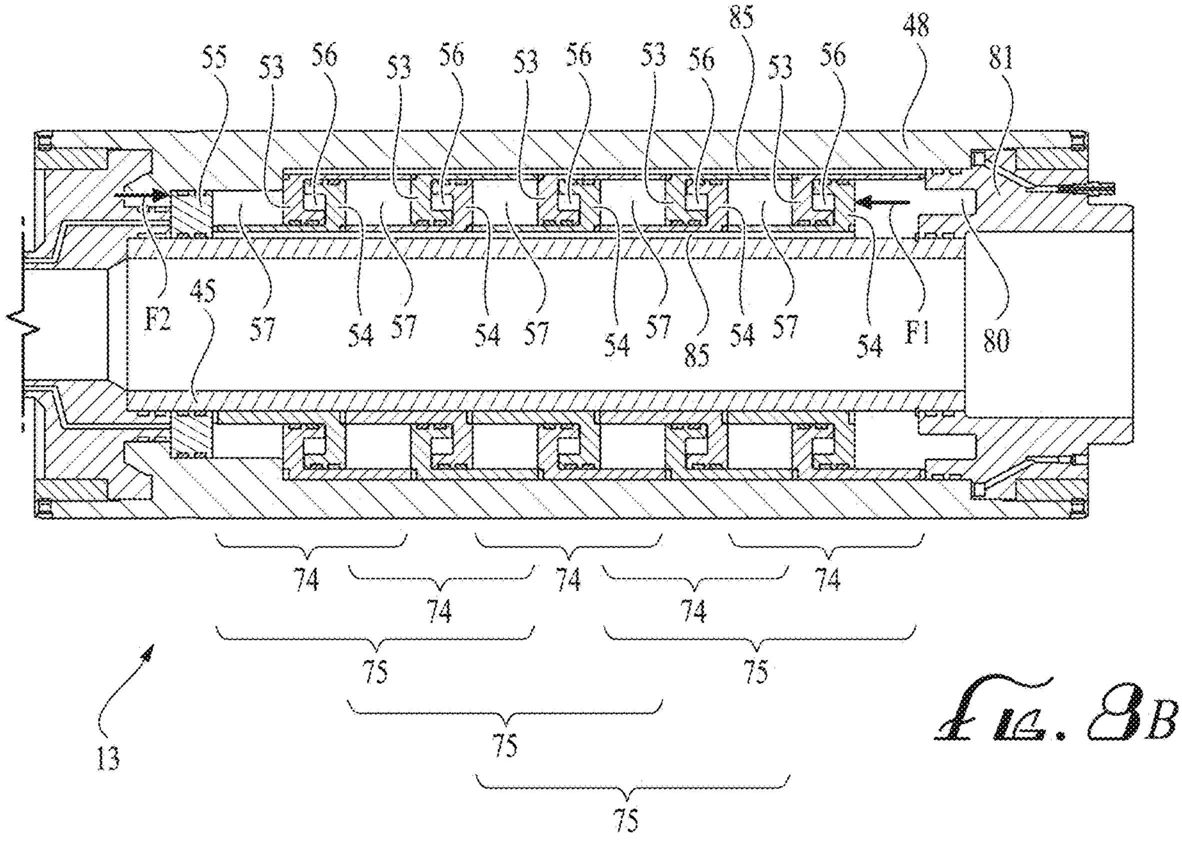
FIG. 8B is a cross-sectional side view of the energy delivery system of FIG. 8A in the closed position.

Referring to FIGS. 3, 8A, and 8B, an energy delivery system 13 for supplying hydraulic pressure for severing an intervention media (e.g., tubular string 18, coil tubing) is shown. The energy delivery system 13 may include a tubular 45 and a housing 48 disposed concentrically about the tubular 45. Isolation pistons 53 may each be disposed between the tubular 45 and the housing 48. Each of the isolation pistons 53 may abut an adjacent isolation piston 53 of the isolation pistons 53. Actuation pistons 54 may each be disposed between the tubular 45 and the housing 48. Each of the actuation pistons 54 may abut an adjacent actuation piston 54 of the actuation pistons 54.

A compression piston 55 may be disposed between the tubular 45 and the housing 48. At least one of the actuation pistons 54 may abut the compression piston 55. A first chamber 25 (e.g., a control chamber) may be formed between the tubular 45, the housing 48, and one of the compression pistons 55. Second chambers 56 may be formed between first pairs 74 of the isolation pistons 53 and the actuation pistons 54. Third chambers 57 may be formed between second pairs 75 of the isolation pistons 53 and the actuation pistons 54. The actuation pistons 54 may be configured to transmit force to the compression piston 55 to reduce a volume of the first chamber 25 to pressurize a control fluid to actuate a ball valve 14 to sever the intervention medium, in response to a directional control valve being deactivated. The actuation pistons 54 may be urged by pressure in the third chambers 57. The third chambers 57 may be pre-pressurized at the surface, for example, by introducing compressed gas into one or more scallops 85. The scallops 85 may include an annular gap between the actuation pistons 54 and the tubular 45 and/or between the isolation pistons 53 and the housing 48. The gaps may be very thin and/or may simply be an unsealed interface between the actuation pistons 54 and the tubular 45 and/or between the isolation piston 53 and the housing 48. The scallops 85 may be in fluid communication with the third chambers 57, and thus pressurization of the scallops 85 may result in pressurization of the third chambers 57.

The third chambers 57 may include a volume between the compression piston 55, one of the isolation pistons 53, one of the actuation pistons 54, and the housing 48; and/or a volume between the second pairs 75 of isolation pistons 53 and actuation pistons 54, and the housing. A balance chamber 80 may be disposed on an opposite side of the isolation pistons 53 and the actuation pistons 54 from the control fluid chamber 25 (e.g., first chamber 25). The control chamber 25 may be in fluid communication with the balance chamber 80. One advantage of the balance chamber 80 may be that the system is agnostic to ambient hydrostatic pressure. That is, ambient hydrostatic pressure would not overpower the pneumatic action of the actuation pistons 54 under normal conditions. For example, if the shear rams 17 were activated, the control lines would be flooded. Thus, the balance chamber 80 would be pressurized and the control fluid chamber 25 would also be pressurized at the same pressure as the balance chamber 80. The projected area of the compression piston 55 may be configured such that the force on the intermediate components (e.g., the actuation pistons 54) between the first chamber 25 and the balance chamber 80 are balanced. Various components may have seals such that that highly pressurized fluid does not make its way inside the second chambers 56 and the third chambers 57.

Figure 8C:
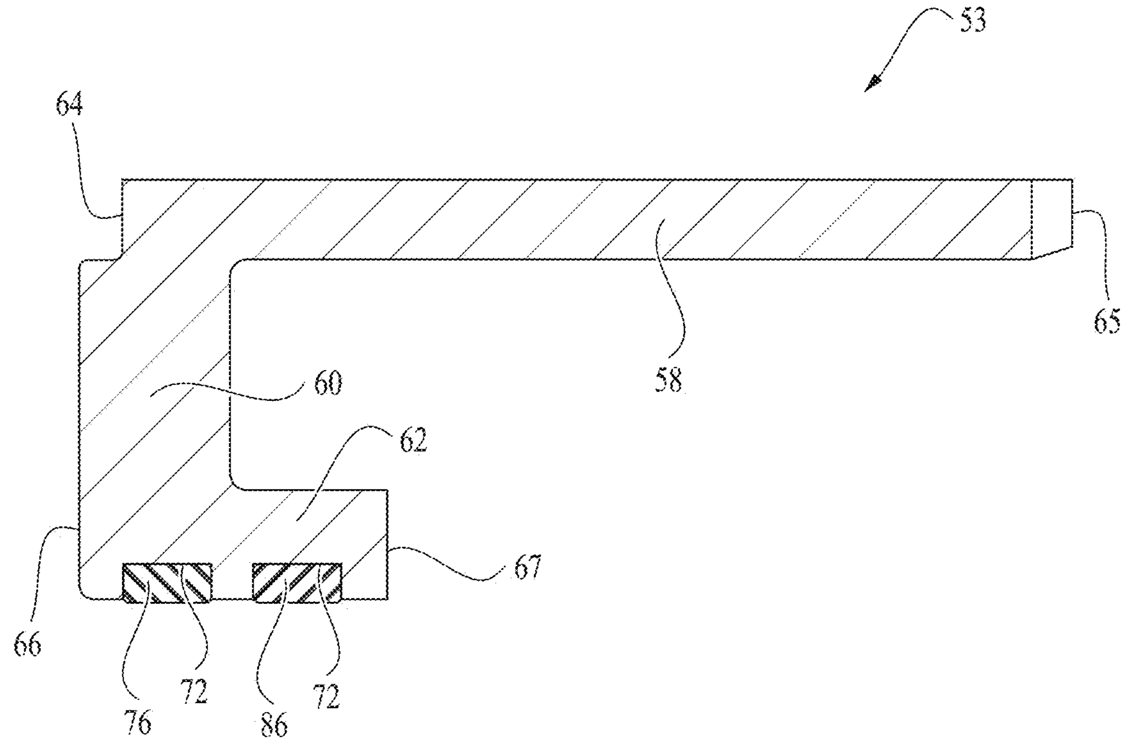
FIG. 8C is a cross-sectional side view of the isolation piston of FIG. 8A.
Figure 8D:
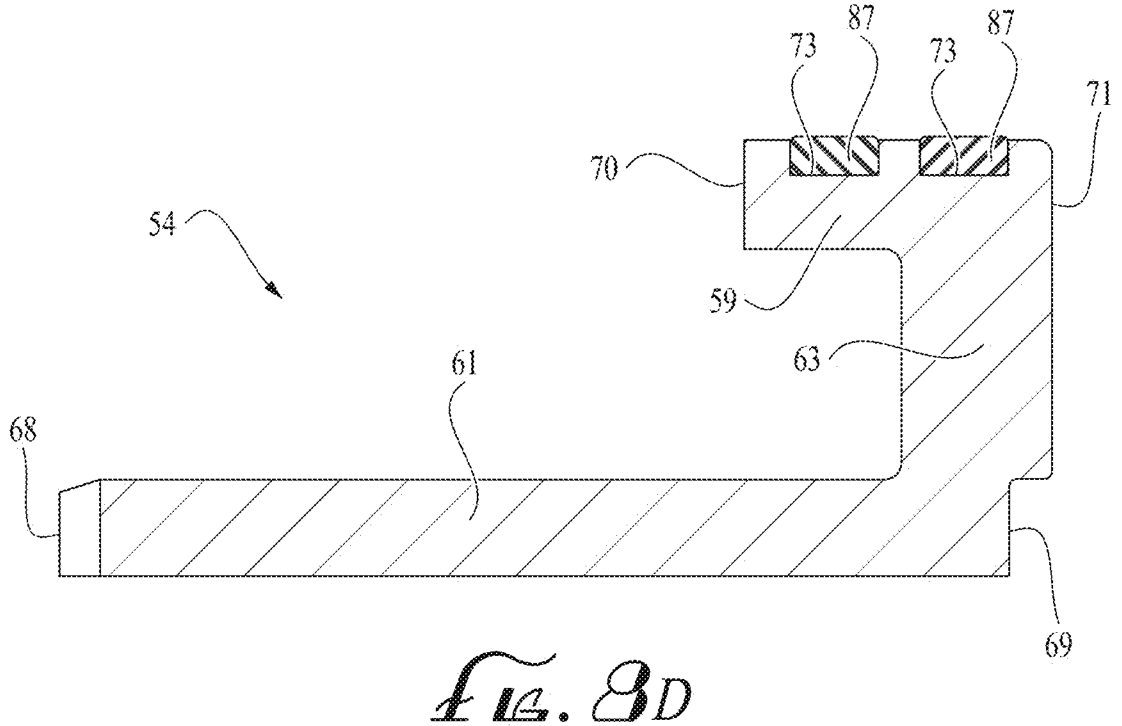
FIG. 8D is a cross-sectional side view of the actuation piston of FIG. 8A.

Referring to FIGS. 8C and 8D, the isolation pistons 53 and the actuation pistons 54 are shown in more detail. Each actuation piston 54 and each isolation piston 53 may have an L-shaped cross-section. Each isolation piston 53 may each have a first segment 58 comprising a first axial end 64 and a second axial end 65, a second segment 62 comprising a first axial end 66 and a second axial end 67, and a third segment 60 extending radially inward from the first axial end 64 of the first segment 58 to the first axial end 66 of the second segment 62. The second segment 62 may be shorter than the first segment 58. The actuation pistons 54 may each have a fourth segment 61 comprising a first axial end 68 and a second axial end 69, a fifth segment 59 comprising a first axial end 70 and a second axial end 71, and a sixth segment 63 extending radially outward from the second axial end 69 of the fourth segment 61 to the second axial end 71 of the fifth segment 59. The fifth segment 59 may be shorter than the fourth segment 61. The first segment 58 may be parallel to the second segment 62, the fifth segment 59, and/or the fourth segment 61. The third segment 60 may be parallel to the sixth segment 63. The second segment may comprise one or more grooves 72 configured to contain one or more seals 86 that seal the second segment 62 to the fourth segment 61. The fifth segment may comprise one or more grooves 73 that contain one or more seals 87 that seal the fifth segment 59 to the first segment 58. The seal(s) 86 in the groove(s) 72 and the seal(s) 87 in the groove(s) 73 may enable the second chambers to be isolated from the third chambers 57. The first axial end 68 of the fourth segment 61 of the actuation piston 54 may be configured to abut the second axial end 69 of an adjacent actuation piston 54.

Figure 9A:
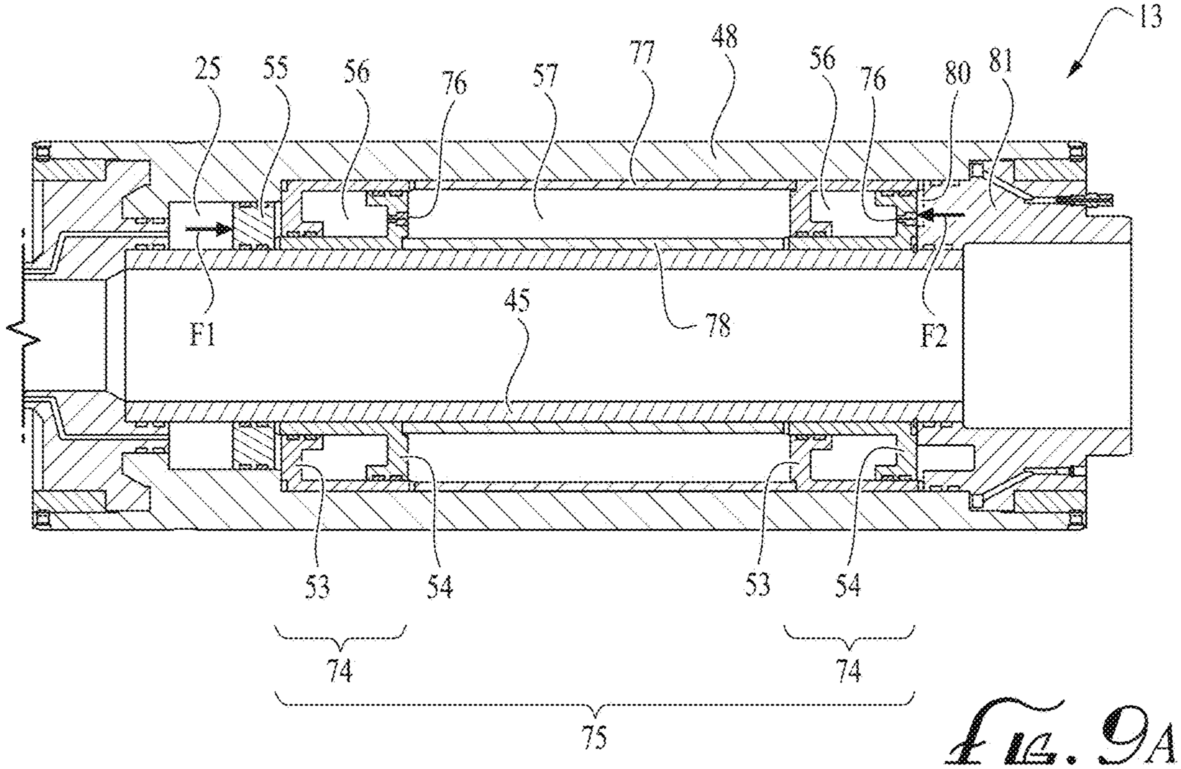
FIG. 9A is a cross-sectional side view of an exemplary energy delivery system, in the open position, according to yet another embodiment.
Figure 9B:
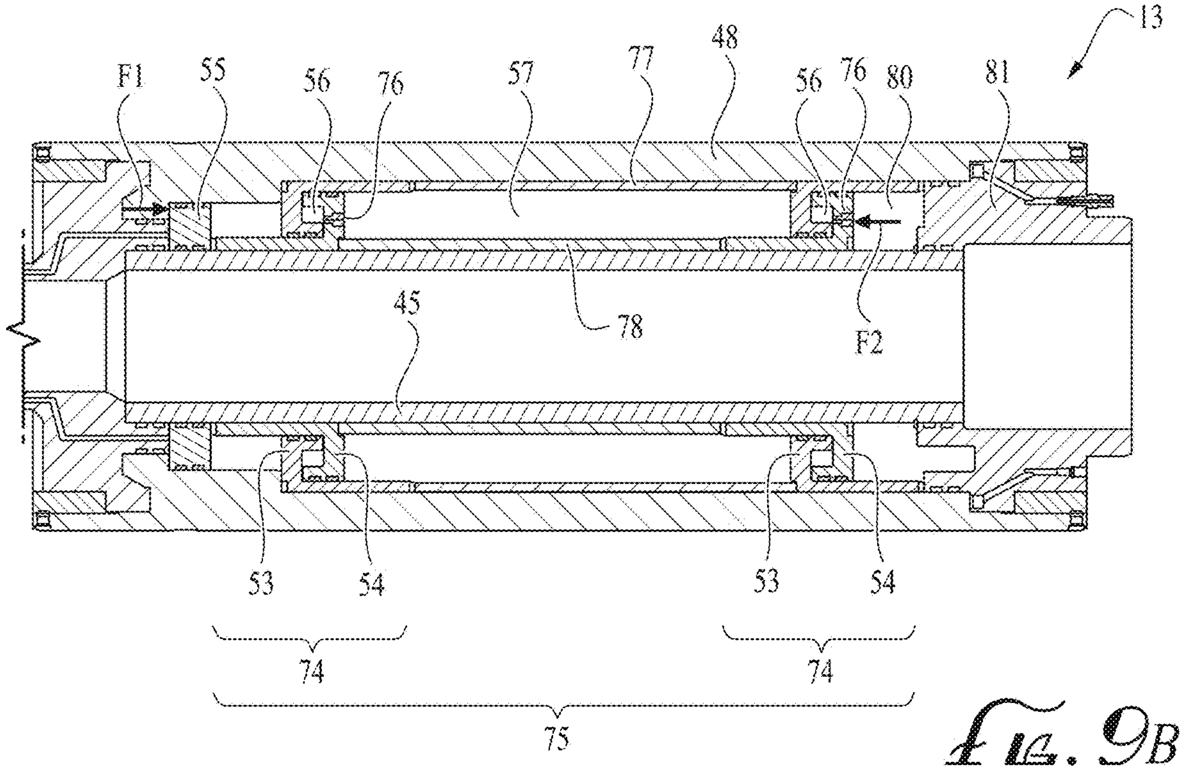
FIG. 9B is a cross-section side view of the energy delivery system of FIG. 9A in the closed position.

Referring to FIG. 9A and 9B, an energy delivery system 13 for supplying hydraulic pressure for severing a tubular string 18 (e.g., coil tubing) according to another embodiment is shown. The embodiment of FIGS. 9A and 9B may be similar to that of FIGS. 8A and 8B. One difference may be is that there are two isolation pistons 53 and two actuation pistons 54 shown in FIGS. 9A and 9B. However, any number of isolation pistons 53 and actuation pistons 54 is within the scope of the present disclosure. For example, there may be one, two, three, four, five, six, seven, eight, nine, ten, or more isolation pistons 53. There may be one, two, three, four, five, six, seven, eight, nine, ten, or more actuation pistons 54. In FIG. 9A and 9B, the two isolation pistons 53 may abut and/or be separated by an isolation spacer 77. The two actuation pistons 54 may abut and/or be separated by an actuation spacer 78. The isolation spacer 77 may be a tubular and/or the actuation spacer 78 may be a tubular. The isolation spacer 77 may have a larger inner diameter than an outer diameter of the actuation spacer 78. The third chamber 57 may include the space of and/or be defined by isolation spacer 77, the actuation spacer 78, one of the isolation pistons 53, and one of the actuation pistons 54. The balance chamber 80 may be defined by and/or formed between one of the actuation spacers 78, one of the isolation spacers 77, and the tubular 45.

The third chamber 57 may be pressurized (e.g., with nitrogen or air) to move the actuation pistons 54 axially. The movement of the actuation pistons 54 may in turn move the compression piston 55 to reduce the volume of the first chamber 25 (e.g., the control fluid chamber 25). The translation of the actuation pistons 54 towards the stationary isolation pistons 53 may cause a reduction of volume of the second chambers 56, which may have originally contained air or another gas at ambient or near ambient pressure. The gas the second chambers 56 contain may be bled out through check valves 76 in the actuation pistons 54. Because of the arrangement of the seals, a volume between the compression piston 55 and the third chamber 57 may be in fluid communication, and thus pressure from the nitrogen may be applied directly to the compression piston 55 and to the actuation piston 54. The actuation piston 54 may be mechanically coupled to the compression piston 55, and thus the forces resulting from these two pressures may be additive and may strongly urge the compression piston 55 towards the slick joint 12.

In some embodiments, additional actuation pistons 54 and isolations pistons 53 may be added to increase the amount of net force that the pressurized nitrogen is capable of exerting on the compression piston 55. The additional pairs of actuation pistons 54 and isolation pistons 53 may be placed in between the two pairs of actuation pistons 54 and isolation pistons 53 shown in FIGS. 9A and 9B. Any number of actuation pistons 54 and isolation pistons 53 is within the scope of the present disclosure. In some embodiments, a pressure of the nitrogen inside the third chamber 57 is set based on a desired amount of net force on the compression piston 55.

The actuation pistons 54 and the isolation pistons 53 of the embodiment of FIGS. 9A and 9B may be similar or the same as the actuation pistons 54 and the isolation pistons 53 of the embodiment of FIGS. 8A and 8B. One difference may be that while the isolation pistons 53 of the embodiment of FIGS. 8A and 8B may all be the same size and shape and the actuations pistons 54 of the embodiment of FIGS. 8A and 8B may all be the same size and shape, the isolation pistons 53 of the embodiment of FIGS. 9A and 9B may be of difference sizes and/or shapes and the actuation pistons 54 of the embodiment of FIGS. 9A and 9B may be of different sizes and/or shapes depending on the application. In some embodiments, a length of the sixth segment 63 of the actuation piston 54 on the right in FIGS. 9A and 9B is the same as a length of the compression piston 55 (e.g., the length being the difference between the inner and outer diameters of the compression piston 55). This may be advantageous because if certain chambers become flooded with high pressure, the forces on the actuation spacer 78 and/or other elements may be equalized. In some embodiments, the sixth segment 63 of the actuation piston 54 comprises the check valve 76. The principal of operation of the embodiment of FIGS. 9A and 9B may be the same or similar as the principal of operation of the embodiment of FIGS. 8A and 8B.

Pressure in the balance chamber 80 may result in a first force F1 on the actuation pistons 54 that balances a second force F2 on the actuation pistons 54 resulting from pressure in the control fluid chamber 25 (e.g., the first chamber 25). The first force F1 may be a hydrostatic force, the second force F2 may be a hydrostatic force, and the first force F1 may be equal in magnitude to the second force F2.

Figure 10:
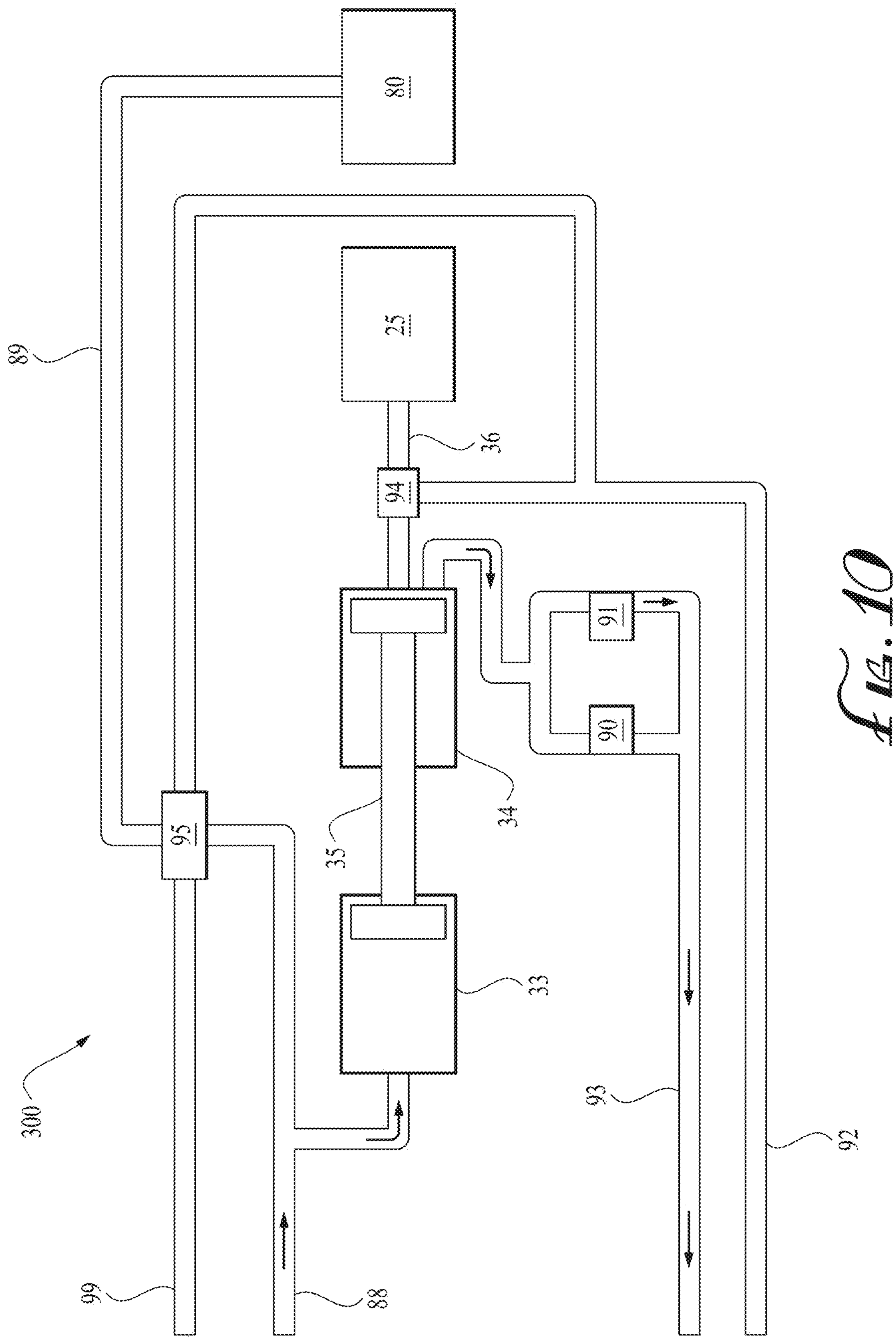
FIG. 10 is a schematic diagram of an exemplary hydraulic system, during a regular transition from a ball-close position to a ball-open position, according to an embodiment.
Figure 11:
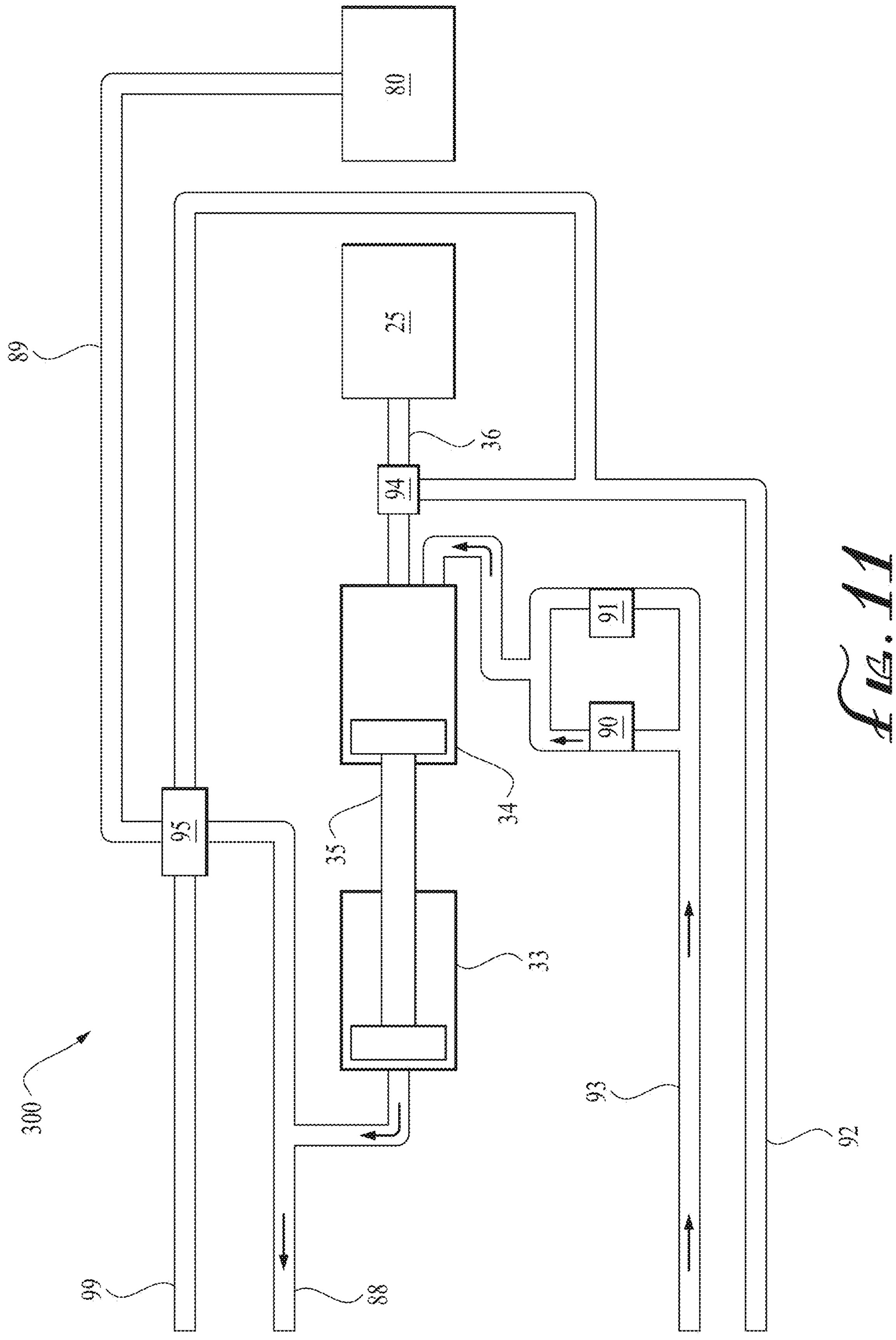
FIG. 11 is a schematic diagram of the hydraulic system of FIG. 10, during a regular transition from the ball-open position to the ball-close position.
Figure 12:
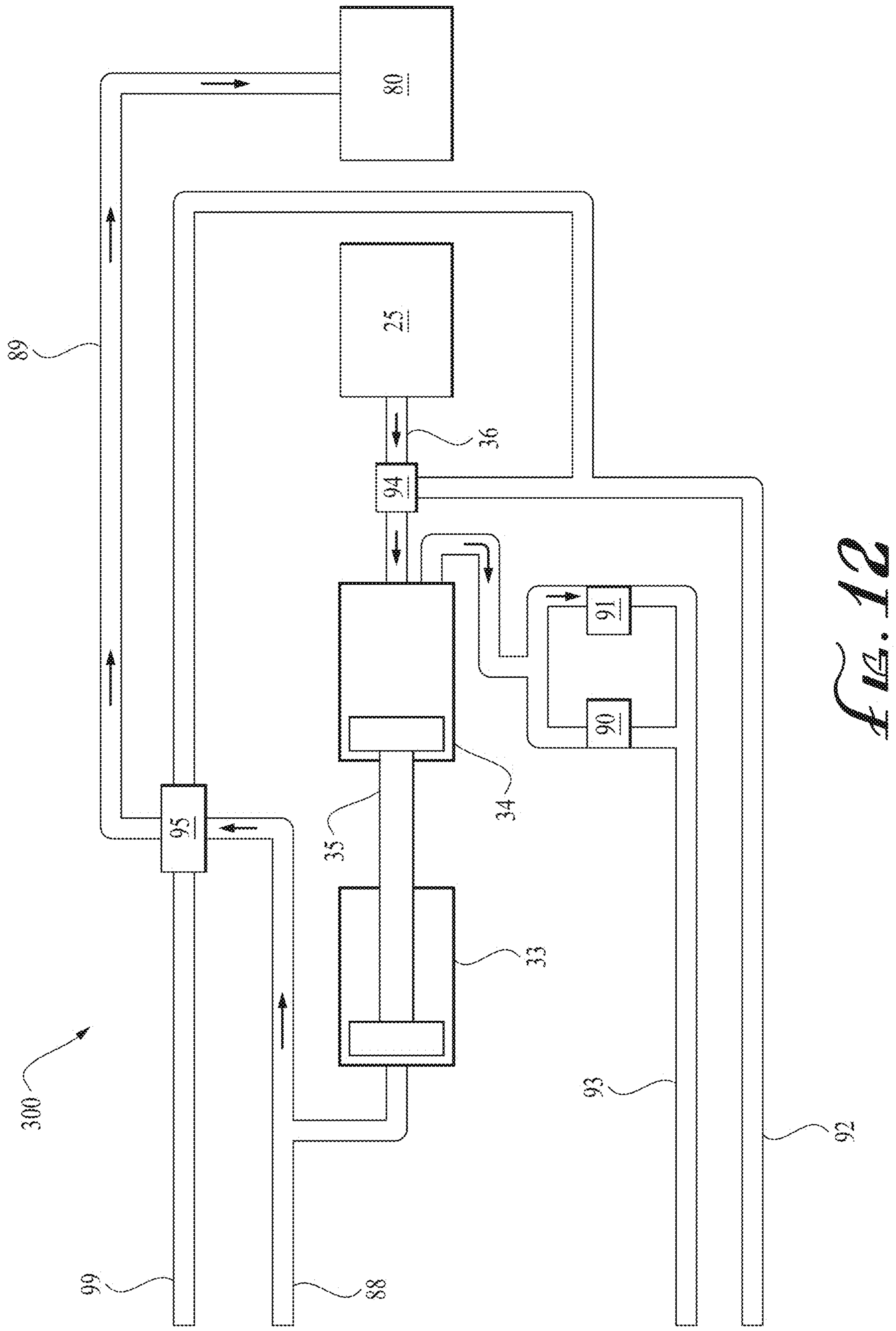
FIG. 12 is a schematic diagram of the hydraulic system of FIG. 10, during an emergency transition from a ball-open to a ball-close position.

Referring to FIGS. 10-12, a schematic of the hydraulic system 300 of the subsea tree 11, the slick joint 12, and the energy delivery system 13 is shown. See also FIG. 3 for reference. The hydraulic system 300 may interact with the pneumatic system (e.g., the pneumatics involved with the second chamber 56 and the third chamber 57). Although the schematic configuration of FIG. 10 is especially useful for the energy delivery systems 13 shown in FIGS. 8 and 9, it could be applied to any of the embodiments described herein and/or variations thereof.

The hydraulic system 300 may include the first actuation chamber 33, the second actuation chamber 34, the control fluid chamber 25 (also referred to herein as the first chamber 25), and the balance chamber 80. A valve-open line 88 may lead to the first actuation chamber 33. The valve-open line may also lead to the second directional control valve (DCV) 95. That is, the valve-open line 88 may fluidly couple the umbilical 15 and the first actuation chamber 33 and may fluidly couple the umbilical and the second DCV 95. A balance line 89 may fluidly couple the second DCV 95 to the balance chamber 80. There may be a balance line 99 leading to the second DCV 95. A pilot line 92 may be fluidly coupled to the first DCV 94 and the second DCV 95. The slick joint line 36 may fluidly couple the control fluid chamber 25 and the second actuation chamber 34. The first DCV 94 may be disposed on the slick joint line 36. The first actuation chamber 33 may be mechanically coupled to the control fluid chamber 25 by the ball piston 35. A valve-close line 93 may lead to the second actuation chamber 34. That is, the valve-close line 93 may couple the umbilical 15 to the second actuation chamber 34. A check valve 90 and a flow restrictor 91 may be disposed on the valve-close line 93 in parallel. For example, the valve-close line 93 may split and the check valve 90 may be disposed on one side of the split and the flow restrictor 91 may be disposed on another side of the split. The split valve-close line 93 may then rejoin into a single line before it reaches the second actuation chamber 34.

FIG. 10 shows the hydraulic system 300 as it transitions regularly from a ball-close position in which the ball valve 14 is in the closed position to a ball-open position in which the ball valve 14 is in the open position. For this transition, the valve-open line 88 line may be pressurized to in turn pressurize the first actuation chamber. This may cause the ball piston 35 to move to the right, thus opening the ball valve. Because there may be fluid in the second actuation chamber 34, that fluid may be forced out through the valve-close line 93 as its volume is decreased by the movement of the ball piston 35. The flow restrictor 91 may slow the flow rate of fluid exiting through the valve-close line 93. The check valve 90 may allow fluid to pass into the second actuation chamber 34 but not out of the second actuation chamber 34. The pilot line 92 may be pressurized, thus activating (or maintaining an active state of) the first DCV 94 and the second DCV 95. When the pilot line 92 is pressurized, fluid may be prevented from entering the balance chamber 80 and/or the control fluid chamber 25.

FIG. 11 shows the hydraulic system 300 as it transitions regularly from a ball-open position in which the ball valve 14 is in the open position to a ball-close position in which the ball valve 14 is in the closed position. The pilot line may be pressurized, and the first DCV 94 and the second DCV 95 may be activated. Thus, fluid may not be able to enter the control fluid chamber 25 and may not be able to enter the balance chamber 80. The valve-close line 93 may be pressurized. The check valve 90 may allow fluid to flow into the second actuation chamber 34. When the second actuation chamber 34 is pressurized, it may cause the ball piston 35 to translate (e.g., left) to open the ball valve 14. This may in turn reduce the volume in the first actuation chamber 33. Because of the reduction in volume, fluid may flow out of the first actuation chamber 33 through the valve-open line 88 and up to the umbilical 15.

In the states shown in FIGS. 10 and 11, the pneumatic components may be in the loaded position. This means that the pneumatic system is ready to fire. The control fluid chamber 25 may experience elevated pressure because nitrogen pressure within the third chambers 57 may tend to push the actuation pistons 31 against the compression piston 55. However, the first DCV 94 may be activated by the pressurized pilot line 92, and thus the compression piston 55 may be unable to move. That is, the incompressible fluid within the control fluid chamber 25 and the slick joint line 36 may be isolated by the first DCV 94.

FIG. 12 shows the hydraulic system 300 as it makes an emergency transition from a ball-open position in which the ball valve 14 is in the open position to a ball-close position in which the ball valve 14 is in the closed position. The emergency transition may be triggered, for example, when the shear ram 17 cuts through the lines (e.g., the pilot line 92, valve-close line 93, and valve-open line 88). It may alternatively be triggered by bleeding the pilot line 92, for example, in response to a command from the emergency shutdown panel 20. The command may cause the hydraulic power unit 16 to operate the umbilical 15 to bleed the pilot line 92 (e.g., which is connected to one of the fluid conduits 136). Once the pilot line 92 has been bled off, the first DCV 94 and the second DVC 95 may be released (e.g., in tandem). The control fluid chamber 25 may then be free to move because the first DCV 94 may no longer be isolating the incompressible fluid within the control fluid chamber 25. The pressurized nitrogen within the second chambers 56 may urge the compression piston 55 to the left, which may reduce the volume of the first chamber 25 (and also reduce volume of the third chambers 57), and thus cause fluid to be transferred through the slick joint line 36 into the second actuation chamber 34. The check valve 90 may not allow fluid to be transferred through it and out of the second actuation chamber 34, and thus the only way the fluid has to escape the second actuation chamber 34 may be through the flow restrictor 91. Since the flow restrictor 91 may restrict the rate of flow out of the second actuation chamber 34, the hydraulic pressure of the fluid may urge the ball piston 35 to the left, thus closing the ball valve 14. The time of the bleed-off through the flow restrictor 91 may be, for example, 2-5 minutes. Alternatively, it may be 1-6 minutes, 3-7 minutes, or 4-8 minutes, or any other suitable time period. The deactivation of the second DCV 95 may also allow fluid from the first actuation chamber 33 to be ported into the balance line 89 to enter the balance chamber 80. This may allow the subsea tree to be pumped through at a lower pressure after the shear event.

The balance chamber 80 may allow the hydraulic system 300 to be agnostic as to the bore pressure. When the lines are severed, there may be hydrostatic pressure pushing against the ball piston 35 from the first actuation chamber 33, which may also cause pressure through the second actuation chamber 34, the slick joint line 36, and the control fluid chamber 25 on the actuation pistons 31. Hydrostatic pressure may also be acting on the actuation pistons 31 in the opposite direction through the balance chamber 80, which may balance the hydrostatic force on the actuation pistons 31.

The balance chamber may also solve a potential timing issue. By providing the balance line 89 to directly couple the first actuation chamber 33 to the balance chamber 80, fluid may not need to be transferred from the first actuation chamber 33 all the way up (potentially 10,000 ft) to the umbilical 15 and then back down to the balance chamber 80. Instead, fluid communication may be enabled directly between the the first actuation chamber 33 and the balance chamber 80. By using the DCV and severing all lines for the emergency ball close operation, it may not be necessary to lift the hydrostatic head off of the subsea tree 11, but instead fluid may be rerouted to the balance chamber 80. In other words, without the shear, fluid may have to be pushed through the first actuation chamber 33 up through the umbilical, which takes time. Instead, by allowing the first actuation chamber 33 to connect to the balance chamber 80, the fluid may be advantageously rerouted. Closing a ball valve of a conventional subsea tree may take 2-3 minutes on a 10,000 ft umbilical, while closing the ball valve of the subsea safety tree according to the present disclosure may take less than 7 seconds. In various embodiments, the closure of the ball valve of the present disclosure may take less than 30 seconds, less than 20 seconds, less than ten seconds, less than 5 seconds, or less than 3 seconds (e.g., 10, 9, 8, 7, 6, 5, 4, 3, 2, or 1 second). In some embodiments, closure of the ball valve may take 2-30 seconds, 4-20 seconds, or 5-10 seconds. Another advantage of the energy delivery system 13 may be the ability to quickly close the ball valve 14. The nitrogen pressure required to activate the energy delivery system may be pre-charged (e.g., charged at the surface before the energy delivery system 13 is deployed), and thus the nitrogen pressure may be delivered more directly without having to go through the umbilical 15. Another advantage of the hydraulic system of the present disclosure is that because the fluid is transferred from the control fluid chamber 25 to the balance chamber 80, it may avoid the need to draw dirty fluid from the reservoir.

Figure 13:
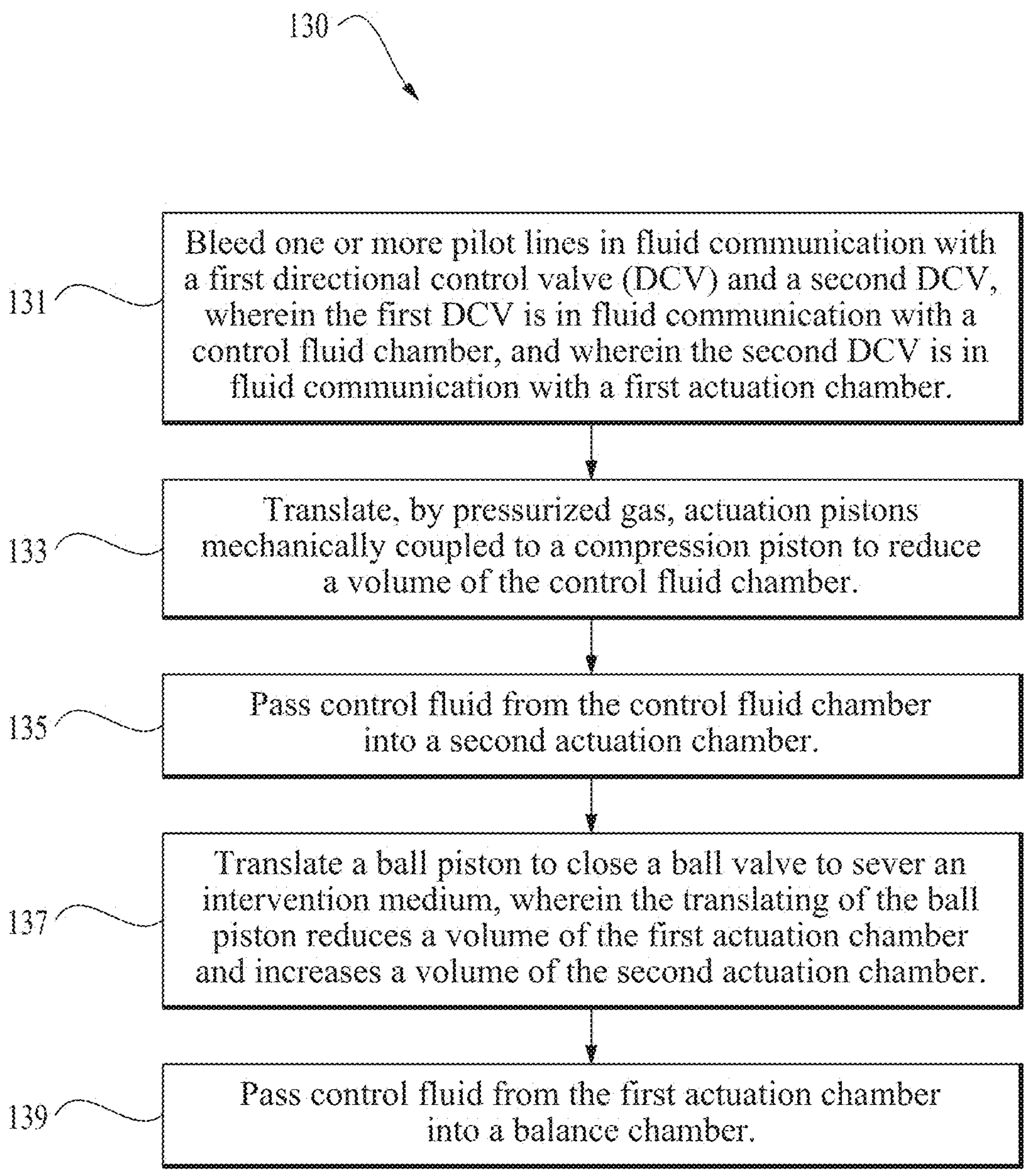
FIG. 13 is a flow diagram of an exemplary method for severing an intervention medium, according to an embodiment.

FIG. 13 shows an exemplary method of severing an intervention medium. The method 130 may include the step 131 of bleeding a pilot line in fluid communication with a first directional control valve (DCV) and a second DCV, wherein the first DCV is in fluid communication with a control fluid chamber, and wherein the second DCV is in fluid communication with a first actuation chamber; the step 133 of translating, by pressurized gas, actuation pistons mechanically coupled to a compression piston to reduce a volume of a control fluid chamber; the step 135 of passing, by the reducing of the volume of the control fluid chamber, control fluid from the control fluid chamber, through the first DCV, and into a second actuation chamber; the step 139 of translating, by the passing of the control fluid into the second actuation chamber, a ball piston to close a ball valve to sever an intervention medium, wherein the translating of the ball piston reduces a volume of the first actuation chamber; and/or the step 139 of passing, by the reducing of the volume of the first actuation chamber, control fluid from the first actuation chamber, through the second DCV, and into a balance chamber.

Pressure in the balance chamber may result in a first force on the actuation pistons that balances a second force on the actuation pistons resulting from pressure in the control fluid chamber. The first force may be a hydrostatic force, the second force may be a hydrostatic force, and the first force may be equal in magnitude to the second force. The translating of the actuation pistons may reduce a volume between first pairs of the actuation pistons and isolation pistons. The first volumes of gas between the first pairs of the actuation pistons and the isolation pistons may be isolated from second volumes of gas between second pairs of the actuation pistons and the isolation pistons. The control fluid may be isolated from the first volume of gas and the second volume of gas. The actuation pistons may slide against isolation pistons. The isolation pistons may be disposed between a tubular and a housing. The actuation pistons may be disposed between the tubular and the housing. The compression piston may be disposed between the tubular and the housing. The control fluid chamber may be formed between the tubular and the housing. One or more first chambers may be formed between first pairs of the isolation pistons and the actuation pistons. One or more second chambers may be formed between second pairs of the isolation pistons and the actuation pistons. The actuation pistons may transmit force to the compression piston to reduce a volume of the control fluid chamber to pressurize the control fluid.

The isolation pistons may each comprise a first segment comprising a first axial end and a second axial end, a second segment comprising a first axial end and a second axial end, and a third segment extending radially inward from the first axial end of the first segment to the first axial end of the second segment. The second segment may be shorter than the first segment. The actuation pistons may each comprise a fourth segment comprising a first axial end and a second axial end. A fifth segment may comprise a first axial end and a second axial end. A sixth segment may extend radially outward from the second axial end of the fourth segment to the second axial end of the fifth segment. The fifth segment may be shorter than the fourth segment.

The systems and methods disclosed herein may present the advantage of severing an intervention medium more quickly and reliably as compared to the conventional art. This may be, for example, due to the configuration of the actuation pistons and isolation pistons and/or the configuration of the control fluid chamber and the balance chamber.

Additional Disclosure

The following are non-limiting, specific embodiments in accordance with the present disclosure:

In a first embodiment, an energy delivery system for supplying hydraulic pressure for severing an intervention medium comprises a tubular comprising a first step, a second step, and a third step; a first isolation piston abutting the first step; a second isolation piston abutting the second step; a third isolation piston abutting the third step; an elongated piston disposed concentrically about the tubular, and comprising a flange, a fourth step, a fifth step, and a sixth step; a first actuation piston abutting the fourth step; a second actuation piston abutting the fifth step; a third actuation piston abutting the sixth step; and a housing disposed concentrically about the elongated piston, wherein a control chamber is formed by the tubular, the housing, and the flange, and wherein the first actuation piston, the second actuation piston, and the third actuation piston are configured to transmit force to the elongated piston to reduce a volume of the control chamber to pressurize a control fluid to actuate a ball valve to sever an intervention medium.

A second embodiment can include the energy delivery system of the first embodiment, wherein the ball valve is disposed in a subsea tree coupled to the energy delivery system by a slick joint.

A third embodiment can include the energy delivery system of the first or second embodiments, wherein the subsea tree comprises a first actuation chamber and a second actuation chamber, the ball valve is disposed between the first actuation chamber and the second actuation chamber, and the slick joint comprises a slick joint line fluidly coupling the control chamber and the second actuation chamber.

A fourth embodiment can include the energy delivery system of any of the first through third embodiments, wherein the elongated piston is configured to be urged by gas pressure between the first actuation piston and the second isolation piston, between the second actuation piston and the third isolation piston, and against the third actuation piston.

In a fifth embodiment, an energy delivery system for supplying hydraulic pressure for severing an intervention medium comprises a tubular comprising a first step and a second step; a first isolation piston abutting the first step; a second isolation piston abutting the second step; an elongated piston concentrically disposed about the tubular, mechanically coupled to a ball valve, and comprising a third step and a fourth step; a first actuation piston abutting the third step; and a second actuation piston abutting the fourth step, wherein the first actuation piston and the second actuation piston are configured to transmit force to the elongated piston to actuate the ball valve to sever an intervention medium.

A sixth embodiment can include the energy delivery system of the fifth embodiment, wherein each isolation piston and each actuation piston comprises a pocket.

A seventh embodiment can include the energy delivery system of the fifth or sixth embodiments, wherein the elongated piston is configured to be urged by gas pressure between the second isolation piston and the first actuation piston and against the second actuation piston.

An eighth embodiment can include the energy delivery system of any of the fifth through seventh embodiments, wherein a first volume of gas is isolated between the first isolation piston and the first actuation piston, and a second volume of gas is isolated between the second isolation piston and the second actuation piston.

In a ninth embodiment, an energy delivery system for supplying hydraulic pressure for severing an intervention medium comprises a tubular; a housing disposed concentrically about the tubular; isolation pistons disposed between the tubular and the housing; actuation pistons disposed between the tubular and the housing; and a compression piston disposed between the tubular and the housing, wherein a first chamber is formed between the tubular and the housing, wherein one or more second chambers are formed between one or more first pairs of the isolation pistons and the actuation pistons, wherein one or more third chambers are formed between one or more second pairs of the isolation pistons and the actuation pistons, and wherein the actuation pistons are configured to transmit force to the compression piston to reduce a volume of the first chamber to pressurize a control fluid to actuate a ball valve to sever an intervention medium.

A tenth embodiment can include the energy delivery system of the ninth embodiment, wherein each of the actuation pistons and each of the isolation pistons comprises an L-shaped cross section.

An eleventh embodiment can include the energy delivery system of the ninth or tenth embodiments, wherein the isolation pistons each comprise a first segment comprising a first axial end and a second axial end, a second segment comprising a first axial end and a second axial end, and a third segment extending radially inward from the first axial end of the first segment to the first axial end of the second segment, the second segment is shorter than the first segment, the actuation pistons each comprising a fourth segment comprising a first axial end and a second axial end, a fifth segment comprising a first axial end and a second axial end, and a sixth segment extending radially outward from the second axial end of the fourth segment to the second axial end of the fifth segment, and the fifth segment is shorter than the fourth segment.

A twelfth embodiment can include the energy delivery system of any of the ninth through eleventh embodiments, a balance chamber is formed between the tubular and the housing, the actuation pistons are disposed between the first chamber and the balance chamber, wherein the ball valve is disposed in a subsea safety tree coupled to the energy delivery system by a slick joint, the subsea safety tree comprises a first actuation chamber and a second actuation chamber, the ball valve is disposed between the first actuation chamber and the second actuation chamber, the slick joint comprises a slick joint line fluidly coupling the first chamber and the second actuation chamber.

In a thirteenth embodiment, a method of severing an intervention medium comprises bleeding one or more pilot lines in fluid communication with a first directional control valve (DCV) and a second DCV, wherein the first DCV is in fluid communication with a control fluid chamber, wherein the second DCV is in fluid communication with a first actuation chamber; translating, by pressurized gas, actuation pistons mechanically coupled to a compression piston to reduce a volume of a control fluid chamber; passing, by the reducing of the volume of the control fluid chamber, control fluid from the control fluid chamber, through the first DCV, and into a second actuation chamber; translating, by the passing of the control fluid into the second actuation chamber, a ball piston to close a ball valve to sever an intervention medium, wherein the translating of the ball piston reduces a volume of the first actuation chamber and increases a volume of the second actuation chamber; and passing, by the reducing of the volume of the first actuation chamber, control fluid from the first actuation chamber, through the second DCV, and into a balance chamber.

A fourteenth embodiment can include the method of the thirteenth embodiment, wherein pressure in the balance chamber results in a first force on the actuation pistons that balances a second force on the actuation pistons resulting from pressure in the control fluid chamber.

A fifteenth embodiment can include the method of the thirteenth or fourteenth embodiments, wherein the first force is a hydrostatic force, the second force is a hydrostatic force, and the first force is equal in magnitude to the second force.

A sixteenth embodiment can include the method of any of the thirteenth through fifteenth embodiments, wherein the translating of the actuation pistons reduces a volume between one or more first pairs of the actuation pistons and isolation pistons.

A seventeenth embodiment can include the method of any of the thirteenth through sixteenth embodiments, wherein one or more first volumes of gas between the one or more first pairs of the actuation pistons and the isolation pistons is isolated from one or more second volumes of gas between one or more second pairs of the actuation pistons and the isolation pistons.

An eighteenth embodiment can include the method of any of the thirteenth through seventeenth embodiments, wherein the control fluid is isolated from the one or more first volumes of gas and the one or more second volumes of gas.

A nineteenth embodiment can include the method of any of the thirteenth through eighteenth embodiments, wherein the actuation pistons slide against isolation pistons, the isolation pistons are disposed between a tubular and a housing, the actuation pistons are disposed between the tubular and the housing, the compression piston is disposed between the tubular and the housing, the control fluid chamber is formed between the tubular and the housing, one or more first chambers are formed between one or more first pairs of the isolation pistons and the actuation pistons, one or more second chambers are formed between one or more second pairs of the isolation pistons and the actuation pistons, and the actuation pistons transmit force to the compression piston to reduce the volume of the control fluid chamber to pressurize the control fluid to actuate the ball valve to sever the intervention medium.

A twentieth embodiment can include the method of any of the thirteen through nineteenth embodiments, wherein the isolation pistons each comprise a first segment comprising a first axial end and a second axial end, a second segment comprising a first axial end and a second axial end, and a third segment extending radially inward from the first axial end of the first segment to the first axial end of the second segment, the second segment is shorter than the first segment, the actuation pistons each comprising a fourth segment comprising a first axial end and a second axial end, a fifth segment comprising a first axial end and a second axial end, and a sixth segment extending radially outward from the second axial end of the fourth segment to the second axial end of the fifth segment, and the fifth segment is shorter than the fourth segment.

While embodiments have been shown and described, modifications thereof can be made by one skilled in the art without departing from the spirit and teachings of this disclosure. The embodiments described herein are exemplary only and are not intended to be limiting. Many variations and modifications of the embodiments disclosed herein are possible and are within the scope of this disclosure. For example, the various elements or components may be combined or integrated in another system or certain features may be omitted or not implemented. Also, techniques, systems, subsystems, and methods described and illustrated in the various embodiments as discrete or separate may be combined or integrated with other techniques, systems, subsystems, or methods without departing from the scope of this disclosure. Other items shown or discussed as directly coupled or connected or communicating with each other may be indirectly coupled, connected, or communicated with. Method or process steps set forth may be performed in a different order. The use of terms, such as "first," "second," "third" or "fourth" to describe various processes or structures is only used as a shorthand reference to such steps/structures and does not necessarily imply that such steps/structures are performed/formed in that ordered sequence (unless such requirement is clearly stated explicitly in the specification).

Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, R1, and an upper limit, Ru, is disclosed, any number falling within the range is specifically disclosed. In particular, the following numbers within the range are specifically disclosed: R=R1+k* (Ru-RI), wherein k is a variable ranging from 1 percent to 100 percent with a 1 percent increment, i.e., k is 1 percent, 2 percent, 3 percent, 4 percent, 5 percent, . . . 50 percent, 51 percent, 52 percent, 95 percent, 96 percent, 97 percent, 98 percent, 99 percent, or 100 percent. Moreover, any numerical range defined by two R numbers as defined in the above is also specifically disclosed. Language of degree used herein, such as "approximately," "about," "generally," and "substantially," represent a value, amount, or characteristic close to the stated value, amount, or characteristic that still performs a desired function or achieves a desired result. For example, the language of degree may mean a range of values as understood by a person of skill or, otherwise, an amount that is +/−10%.

Disclosure of a singular element should be understood to provide support for a plurality of the element. It is contemplated that elements of the present disclosure may be duplicated in any suitable quantity.

Use of broader terms such as comprises, includes, having, etc. should be understood to provide support for narrower terms such as consisting of, consisting essentially of, comprised substantially of, etc. When a feature is described as "optional," both embodiments with this feature and embodiments without this feature are disclosed. Similarly, the present disclosure contemplates embodiments where this "optional" feature is required and embodiments where this feature is specifically excluded. The use of the terms such as "high-pressure" and "low-pressure" is intended to only be descriptive of the component and their position within the systems disclosed herein. That is, the use of such terms should not be understood to imply that there is a specific operating pressure or pressure rating for such components. For example, the term "high-pressure" describing a manifold should be understood to refer to a manifold that receives pressurized fluid that has been discharged from a pump irrespective of the actual pressure of the fluid as it leaves the pump or enters the manifold. Similarly, the term "low-pressure" describing a manifold should be understood to refer to a manifold that receives fluid and supplies that fluid to the suction side of the pump irrespective of the actual pressure of the fluid within the low-pressure manifold.

Accordingly, the scope of protection is not limited by the description set out above but is only limited by the claims which follow, that scope including all equivalents of the subject matter of the claims. Each and every claim is incorporated into the specification as embodiments of the present disclosure. Thus, the claims are a further description and are an addition to the embodiments of the present disclosure. The discussion of a reference herein is not an admission that it is prior art, especially any reference that can have a publication date after the priority date of this application. The disclosures of all patents, patent applications, and publications cited herein are hereby incorporated by reference, to the extent that they provide exemplary, procedural, or other details supplementary to those set forth herein.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

As used herein, the term "or" does not require selection of only one element. Thus, the phrase "A or B" is satisfied by either element from the set {A, B}, including multiples of any either element; and the phrase "A, B, or C" is satisfied by any element from the set {A, B, C} or any combination thereof, including multiples of any element. A clause that recites "A, B, or C" can be infringed with only one of the listed items, multiple of the listed items, and one or more of the items in the list and another item not listed.

As used herein, the article "a" means "one or more." As used herein, the article "an" means "one or more." As used herein, the article "the" when referring to a singular noun means "the one or more." Thus, the phrase "an element" means "one or more elements;" and the phrase "the element" means "the one or more elements."

As used herein, the term "and/or" includes any combination of the elements associated with the "and/or" term. Thus, the phrase "A, B, and/or C" includes any of A alone, B alone, C alone, A and B together, B and C together, A and C together, or A, B, and C together.

What is claimed is:

1. An energy delivery system for supplying hydraulic pressure, comprising:

- a tubular comprising a first step, a second step, and a third step;
- a first isolation piston abutting the first step;
- a second isolation piston abutting the second step;
- a third isolation piston abutting the third step;
- an elongated piston disposed concentrically about the tubular, and comprising a flange, a fourth step, a fifth step, and a sixth step;
- a first actuation piston abutting the fourth step;
- a second actuation piston abutting the fifth step;
- a third actuation piston abutting the sixth step; and
- a housing disposed concentrically about the elongated piston,
- wherein a control chamber is formed by the tubular, the housing, and the flange, and
- wherein the first actuation piston, the second actuation piston, and the third actuation piston are configured to transmit force to the elongated piston to reduce a volume of the control chamber to pressurize a control fluid to actuate a ball valve.

2. The energy delivery system of claim 1, wherein the ball valve is disposed in a subsea tree coupled to the energy delivery system by a slick joint.

3. The energy delivery system of claim 2, wherein

- the subsea tree comprises a first actuation chamber and a second actuation chamber,
- the ball valve is disposed between the first actuation chamber and the second actuation chamber, and
- the slick joint comprises a slick joint line fluidly coupling the control chamber and the second actuation chamber.

4. The energy delivery system of claim 2, wherein the elongated piston is configured to be urged by gas pressure between the first actuation piston and the second isolation piston, between the second actuation piston and the third isolation piston, and against the third actuation piston.

5. The energy delivery system of claim 1, wherein the actuation of the ball valve severs an intervention medium, a control line, a tubular string, a coil tubing, or a workstring.

6. An energy delivery system for supplying hydraulic pressure, comprising:

- a tubular comprising a first step and a second step;
- a first isolation piston abutting the first step;
- a second isolation piston abutting the second step;
- an elongated piston concentrically disposed about the tubular, mechanically coupled to a ball valve, and comprising a third step and a fourth step;
- a first actuation piston abutting the third step; and
- a second actuation piston abutting the fourth step,
- wherein the elongated piston is configured to be urged by gas pressure between the second isolation piston and the first actuation piston and against the second actuation piston, and
- wherein the first actuation piston and the second actuation piston are configured to transmit force to the elongated piston to actuate the ball valve.

7. The energy delivery system of claim 6, wherein each isolation piston and each actuation piston comprises a pocket.

8. The energy delivery system of claim 6, wherein a first volume of gas is isolated between the first isolation piston and the first actuation piston, and a second volume of gas is isolated between the second isolation piston and the second actuation piston.

9. The energy delivery system of claim 6, wherein the actuation of the ball valve severs an intervention medium, a control line, a tubular string, a coil tubing, or a workstring.

10. An energy delivery system for supplying hydraulic pressure, comprising:

- a tubular;
- a housing disposed concentrically about the tubular;
- isolation pistons disposed between the tubular and the housing;
- actuation pistons disposed between the tubular and the housing; and
- a compression piston disposed between the tubular and the housing,
- wherein a first chamber is formed between the tubular and the housing,
- wherein one or more second chambers are formed between one or more first pairs of the isolation pistons and the actuation pistons,
- wherein one or more third chambers are formed between one or more second pairs of the isolation pistons and the actuation pistons,
- wherein the isolation pistons each comprise a first segment comprising a first axial end and a second axial end, a second segment comprising a first axial end and a second axial end, and a third segment extending radially inward from the first axial end of the first segment to the first axial end of the second segment,
- wherein the second segment is shorter than the first segment,
- wherein the actuation pistons each comprise a fourth segment comprising a first axial end and a second axial end, a fifth segment comprising a first axial end and a second axial end, and a sixth segment extending radially outward from the second axial end of the fourth segment to the second axial end of the fifth segment, wherein the fifth segment is shorter than the fourth segment, and wherein the actuation pistons are configured to transmit force to the compression piston to reduce a volume of the first chamber to pressurize a control fluid to actuate a ball valve.

11. The energy delivery system of claim 10, wherein each of the actuation pistons and each of the isolation pistons comprises an L-shaped cross section.

12. The energy delivery system of claim 10, wherein a balance chamber is formed between the tubular and the housing, the actuation pistons are disposed between the first chamber and the balance chamber, the ball valve is disposed in a subsea tree coupled to the energy delivery system by a slick joint, the subsea tree comprises a first actuation chamber and a second actuation chamber, the ball valve is disposed between the first actuation chamber and the second actuation chamber, the slick joint comprises a slick joint line fluidly coupling the first chamber and the second actuation chamber.

13. The energy delivery system of claim 10, wherein the actuation of the ball valve severs an intervention medium, a control line, a tubular string, a coil tubing, or a workstring.

14. The energy delivery system of claim 10, wherein a balance chamber is formed between the tubular and the housing.

15. The energy delivery system of claim 14, wherein the actuation pistons are disposed between the first chamber and the balance chamber, the ball valve is disposed in a subsea tree coupled to the energy delivery system by a slick joint, the subsea tree comprises a first actuation chamber and a second actuation chamber, and the ball valve is disposed between the first actuation chamber and the second actuation chamber.

16. An energy delivery system for supplying hydraulic pressure, comprising:

a tubular;

a housing disposed concentrically about the tubular;

isolation pistons disposed between the tubular and the housing;

actuation pistons disposed between the tubular and the housing; and a compression piston disposed between the tubular and the housing, wherein a first chamber is formed between the tubular and the housing, wherein one or more second chambers are formed between one or more first pairs of the isolation pistons and the actuation pistons, wherein one or more third chambers are formed between one or more second pairs of the isolation pistons and the actuation pistons, wherein a balance chamber is formed between the tubular and the housing, wherein the actuation pistons are disposed between the first chamber and the balance chamber, wherein a ball valve is disposed in a subsea tree coupled to the energy delivery system by a slick joint, wherein the subsea tree comprises a first actuation chamber and a second actuation chamber, wherein the ball valve is disposed between the first actuation chamber and the second actuation chamber, wherein the slick joint comprises a slick joint line fluidly coupling the first chamber and the second actuation chamber, and wherein the actuation pistons are configured to transmit force to the compression piston to reduce a volume of the first chamber to pressurize a control fluid to actuate the ball valve.

17. The energy delivery system of claim 16, wherein each of the actuation pistons and each of the isolation pistons comprises an L-shaped cross section.

18. The energy delivery system of claim 16, wherein the isolation pistons each comprise a first segment comprising a first axial end and a second axial end, a second segment comprising a first axial end and a second axial end, and a third segment extending radially inward from the first axial end of the first segment to the first axial end of the second segment.

19. The energy delivery system of claim 18, wherein the second segment is shorter than the first segment.

20. The energy delivery system of claim 19, wherein the actuation pistons each comprise a fourth segment comprising a first axial end and a second axial end, a fifth segment comprising a first axial end and a second axial end, and a sixth segment extending radially outward from the second axial end of the fourth segment to the second axial end of the fifth segment.

* * * * *